United States Patent [19]
Hamaguchi et al.

[11] Patent Number: 5,726,702
[45] Date of Patent: Mar. 10, 1998

[54] TELEVISION SIGNAL RECEIVING APPARATUS INCORPORATING AN INFORMATION RETRIEVING AND REPRODUCING APPARATUS

[75] Inventors: Masakazu Hamaguchi, Ebina; Hiroaki Takahashi, Yokohama; Takashi Takeuchi, Fujisawa; Toshiyuki Oda, Kawasaki; Tomochika Yamashita, Yokohama; Hitoshi Akiyama, Yokokama; Isao Saito, Yokohama, all of Japan

[73] Assignee: Hitachi, Ltd., Tokyo, Japan

[21] Appl. No.: 393,335

[22] Filed: Feb. 23, 1995

[30] Foreign Application Priority Data

Feb. 23, 1994 [JP] Japan .................. 6-025459
Feb. 28, 1994 [JP] Japan .................. 6-029994

[51] Int. Cl.⁶ .................................. H04N 5/445
[52] U.S. Cl. ............... 348/13; 348/906; 348/563; 348/570
[58] Field of Search ............. ; 348/906, 563, 348/570, 13, 460, 473, 476, 477, 478, 486; 386/35, 83, 125, 126; H04N 5/445

[56] References Cited

U.S. PATENT DOCUMENTS 5,301,028  4/1994  Barker et al. .

FOREIGN PATENT DOCUMENTS 0190088    7/1990   Japan .................. H04N 5/445
A-3-53774  3/1991   Japan .
0126387    5/1991   Japan .................. H04N 5/445
A-4-227381 8/1992   Japan .
2232031    11/1990  United Kingdom ........ H04N 5/445

OTHER PUBLICATIONS

Gunn et al. "A Public Broadcaster's View of Teletext in the United States", 26–28 Mar. 1980.

Dufresne, Michel "New Services: An Integrated Cable Network's Approach NCTA Annual Convention & Exposition" May 3–5 1982 Los Vegas pp. 156–160.

Primary Examiner—David E. Harvey
Attorney, Agent, or Firm—Bardehle, Pagenberg, Dost, Altenburg, Frohwitter, Geissler

[57] ABSTRACT

A television signal receiving apparatus which can read program information relevant to a television program from an optical disk medium, interlocked with the television program and can reproduce and display the read program information. Program information (broadcasting information including program names, broadcasting channel names and broadcasting dates and times and appendant information relevant to the contents of the programs) relevant to the television programs to be displayed by the television receiver/display is recorded in the optical disk medium. When a user instructs a display of the program information by the selection and decision input unit, the television control unit transmits the display request and time information from the clock apparatus to the control unit of the optical disk unit. The control unit makes the appendant information to be reproduced from the optical disk medium, by using the broadcasting channel name and the time information as retrieval information. The appendant information is sent to the television receiver/display through the interface and is displayed in a picture and sound.

12 Claims, 22 Drawing Sheets

FIG.2

| PROGRAM NAME | BROADCASTING INFORMATION ||||  APPENDANT INFORMATION |
|---|---|---|---|---|---|
| | BROADCASTING CHANNEL | BROADCASTING DAY | BROADCASTING TIME || |
| | | | BROADCASTING STARTING TIME | BROADCASTING CLOSING TIME | |
| PROFESSIONAL SOCCER ; AA vs BB | CHANNEL 7 | SATURDAY, NOVEMBER 30, 1995 | 19:00 | 20:55 | PROFILE OF THE TEAM / PLAYERS |
| SUNDAY MOVIE THEATER XXXXX | CHANNEL 9 | SUNDAY, DECEMBER 1, 1995 | 21:00 | 22:55 | PROFILE OF ACTORS / ACTRESSES / DIRECTORS |
| ⋯ | | | | | |

FIG. 5A  HIERARCHICAL STRUCTURE OF FILES

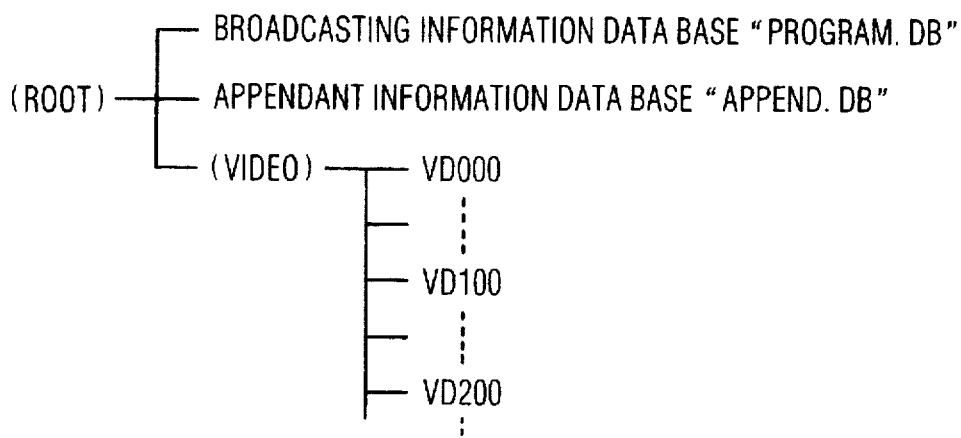

FIG. 5B  BROADCASTING INFORMATION DATA BASE "PROGRAM. DB"

| FIELD / RECORD | BROADCASTING DAY | BROADCASTING TIME | BROADCASTING CHANNEL | APPENDANT INFORMATION |
|---|---|---|---|---|
| RECORD 0 | 1995/11/30 (SAT) | 19:00~20:55 | 7 | 200 |
| RECORD 1 | 1995/12/1 (SUN) | 21:00~22:55 | 9 | 300 |

FIG. 5C  APPENDANT INFORMATION DATA BASE "APPEND. DB"

| FIELD / RECORD | PROGRAM NAME | PROGRAM GENRE NAME | RELEVANT VIDEO FILE NAME |
|---|---|---|---|
| RECORD 200 | PROFESSIONAL SOCCER AA VS. BB | SPORTS | VD100 |
| RECORD 300 | SUNDAY MOVIE THEATER XXXXX | MOVIE | VD200 |

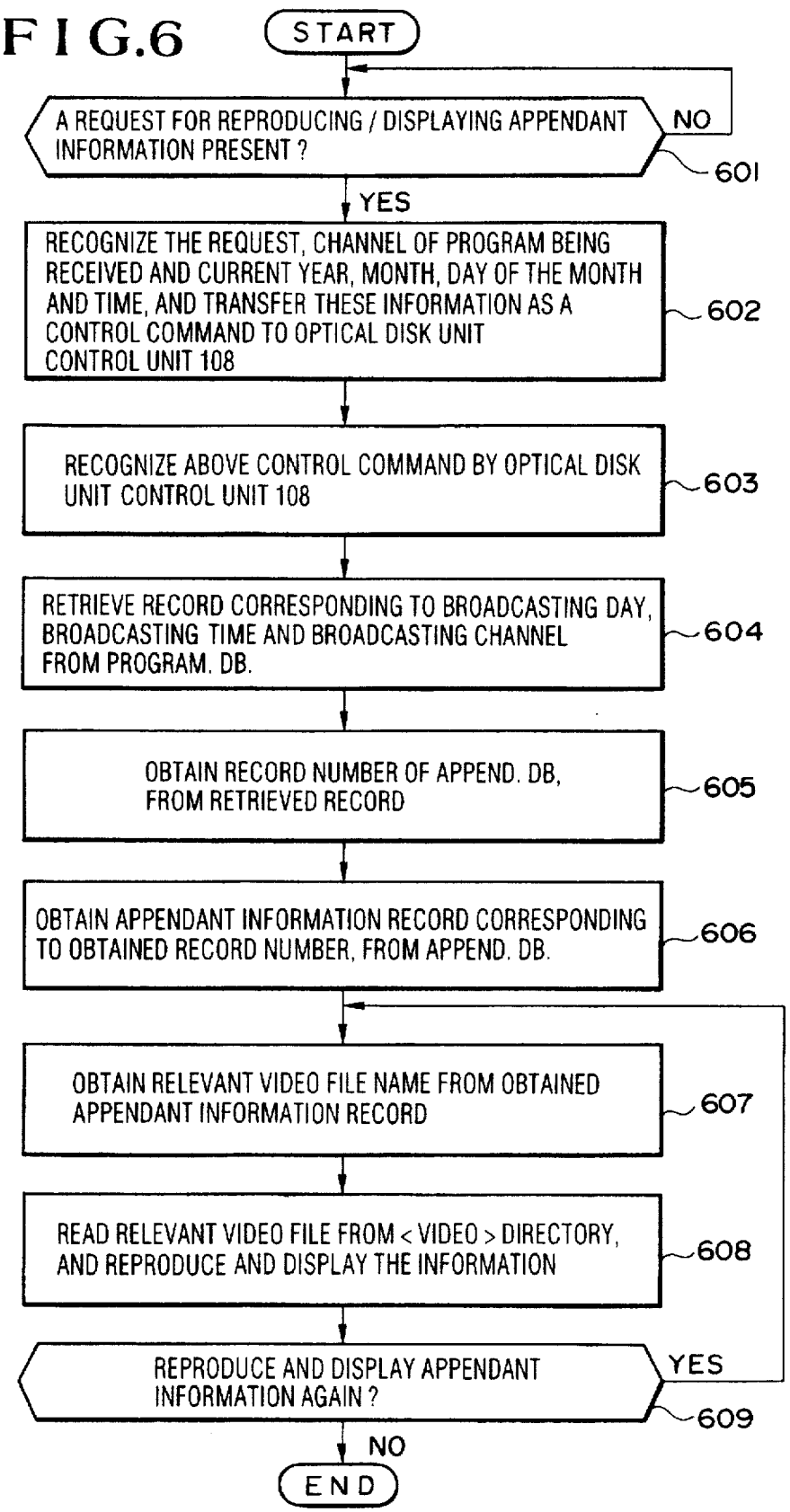

FIG.7A HIERARCHICAL STRUCTURE OF FILES

```
                    ┌── BROADCASTING INFORMATION DATA BASE "PROGRAM.DB"
(ROOT) ──┤
         └── (VIDEO) ──┬── VD000
                       ├── ---
                       ├── VD100
                       ├── ---
                       └── VD200
```

FIG.7B BROADCASTING INFORMATION DATA BASE "PROGRAM.DB"

| FIELD / RECORD | BROADCASTING DAY | BROADCASTING TIME | BROADCASTING CHANNEL | PROGRAM NAME | PROGRAM GENRE NAME | RELEVANT VIDEO FILE NAME |
|---|---|---|---|---|---|---|
| RECORD 0 | 1995/11/30 (SAT) | 19:00~20:55 | 7 | PROFESSIONAL SOCCER AA VS. BB | SPORTS | VD100 |
| RECORD 1 | 1995/12/1 (SUN) | 21:00~22:55 | 9 | SUNDAY MOVIE THEATER XXXXX | MOVIE | VD200 |
| ⋯ | | | | | | |

FIG.8

| 2ch AAA TELEVISION | 5ch BBB TELEVISION | | 7ch CCC TELEVISION |
|---|---|---|---|
| 6:15 MORNING EXERCISE | 6:15 COME TOGETHER BOYS AND GIRLS<br>△ GOOD MORNING TO EVERY BODY<br>△ LET'S PLAY TOGETHER | 6 | 6:15 MORNING IN JAPAN |
| 6:30 TODAY'S WEATHER | | | 6:30 SPORTS<br>△ PROFESSIONAL SOCCER |
| 7:00 NEWS AT 7 O'CLOCK<br>△ WORLD ECONOMIC SITUATION<br>△ GENERAL ELECTION ESTIMATE | 7:00 FRESH MORNING<br>△ HEATED ELECTION CAMPAIGN<br>△ YESTERDAY'S SPORTS | 7 | 7:00 SERIES DRAMA, COME SPRING!|
| | | | 7:30 HEALTH CONSULTANT<br>△ COLD SEASON AND HYPERTENSION |

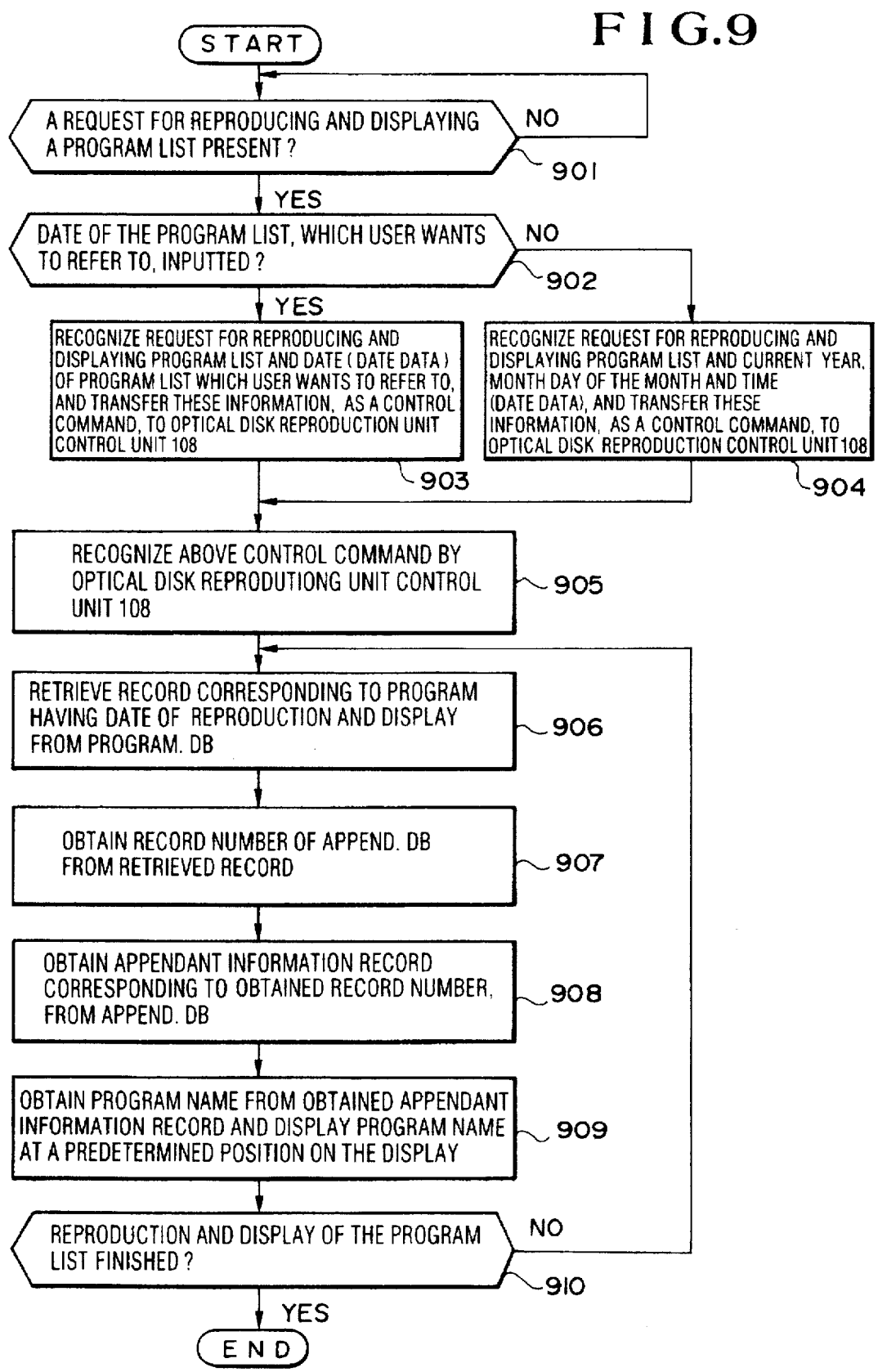

FIG.11

| PROGRAM NAME | BROAD-CASTING CHANNEL | BROAD-CASTING DAY | BROADCASTING TIME | | KEY WORD | | | GUIDANCE OF CONTENTS |
|---|---|---|---|---|---|---|---|---|
| | | | STARTING TIME | ENDING TIME | GENRE | | OTHERS | |
| PROFESSIONAL SOCCER, AA VS. BB | 7 | 1995/11/30 SATURDAY | 19:00 | 20:55 | SPORTS | | ABC PLAY GROUND | THE PLAY OF HIJ MOVED FROM THE EFG TEAM IS A HIGH-LIGHT IN THE THIRD GAME BETWEEN THE CHAMPION CANDIDATE TEAMS |
| SUNDAY MOVIE THEATER XXXX | 9 | 1995/12/1 SUNDAY | 12:00 | 13:55 | MOVIE | | RELEASED IN 1990 | THE SECOND PRODUCT OF THE DIRECTOR CDE WHO BECOME VERY FAMOUS BY HIS KLM. THE TOP BOX OFFICE MOVIE IN THE YEAR, RELEASED IN 1990 (USA) |
| OPQ FEMALE MARATHON | 7 | 1995/12/1 SUNDAY | 14:00 | 15:55 | SPORTS | | RST PLAY GROUND | LIVE COMMENTARY BY EFG. WORLD TOP RUNNERS LINE UP TOGETHER. NEW RECORDS EXPECTED |

FIG.12A

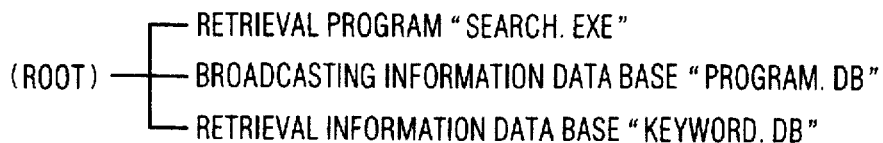

(ROOT) ─┬─ RETRIEVAL PROGRAM "SEARCH.EXE"
        ├─ BROADCASTING INFORMATION DATA BASE "PROGRAM.DB"
        └─ RETRIEVAL INFORMATION DATA BASE "KEYWORD.DB"

FIG.12B

| FIELD / RECORD | BROAD-CASTING DAY | BROAD-CASTING TIME | PROGRAM NAME | BROAD-CASTING CHANNEL | RETRIEVAL INFORMATION |
|---|---|---|---|---|---|
| 0000 | 1995/11/30 (SAT) | 19:00~20:55 | PROFESSIONAL SOCCER AA VS. BB | 7 | 0200 |
| 0001 | 1995/12/1 (SUN) | 12:00~13:55 | SUNDAY MOVIE THEATER XXXX | 9 | 0300 |
| 0002 | 1995/12/1 (SUN) | 14:00~15:55 | OPQ FEMALE MARATHON | 7 | 0400 |
| ⋮ | | | | | |

FIG.12C

| FIELD / RECORD | KEY WOAD | | GUIDANCE OF CONTENTS |
|---|---|---|---|
| | GENRE | OTHERS | |
| 0200 | SPORTS | ABC PLAY GROUND | THE PLAY OF HIJ MOVED FROM THE EFG TEAM IS A HIGH-LIGHT IN THE THIRD GAME BETWEEN THE CHAMPION CANDIDATE TEAMS |
| 0300 | MOVIE | RELEASED IN 1990 | THE SECOND PRODUCT OF THE DIRECTOR CDE WHO BECAME VERY FAMOUS BY HIS KLM. THE TOP BOX OFFICE MOVIE IN THE YEAR. RELEASED IN 1990 (USA) |
| 0400 | SPORTS | RST PLAY GROUND | LIVE COMMENTARY BY EFG. WORLD TOP RUNNERS LINE UP TOGETHER. NEW RECORDS EXPECTED |
| ⋮ | | | |

F I G.13

| ■ PROGRAM RETRIEVAL ■ | | | | | |
|---|---|---|---|---|---|
| CHANNEL | 9 | | | | |
| GENRE / SELECTION | MOVIE | | | | |
| PROGRAM NAME / SELECTION | | | | | |
| DATE | 95 YEAR | 12 MONTH | 1 DAY | | |
| DAY OF THE WEEK | SUN DAY | | | | |
| TIME | 13 O'CLOCK | 00 MINUTES | | | |
| KEY WORD / SELECTION | | | | | |
| KEY WORD / SELECTION | | | | | |

CANCEL BY [CANCEL] KEY / RETRIEVE BY [DECISION] KEY

F I G.14

□ GENRE SELECTION □

| MOVIE | DRAMA |
|---|---|
| SPORTS | WEATHER FORECAST |
| QUIZ | TALK |
| ANIMATION | HOBBIES |
| MUSIC | SCIENCE / CULTURE |
| VARIETY | |
| NEWS / REPORTING | |

CANCEL BY [CANCEL] KEY / DECIDE BY [DECISION] KEY

FIG.15

| | RESULT OF RETRIEVAL | THERE ARE TWO CASE | | 1/1 PAGE |
|---|---|---|---|---|
| No. | YEAR/MONTH/DAY | | TIME | CHANNEL |
| PROGRAM NAME | | | | |
| 1 | 95/12/ 1 | | 12:00 - 13:55 | 9 |
| SUNDAY MOVIE THEATER XXXX | | | | |
| 2 | 95/12/ 1 | | 12:00 - 14:00 | BS 3 |
| SATELLITE THEATER ○○○○ | | | | |
| | | | | |
| CANCEL BY [CANCEL] KEY / PROGRAM INFORMATION BY [DECISION] KEY | | | | |

FIG.16

○ PROGRAM INFORMATION ○

| YEAR/MONTH/DAY | TIME | CHANNEL |
|---|---|---|
| 95/12/ 1 | 12:00 - 13:55 | 9 |
| SUNDAY MOVIE THEATER XXXX | | |
| THE SECOND PRODUCT OF THE DIRECTOR CDE WHO BECAME VERY | | |
| FAMOUS BY HIS KLM. THE TOP BOX OFFICE MOVIE IN THE YEAR. | | |
| RELEASED IN 1990 (USA) | | |
| | | |

RETURN BY [CANCEL] KEY

FIG.19A

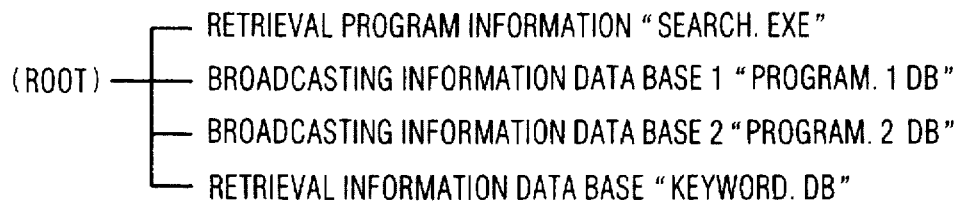

(ROOT) — RETRIEVAL PROGRAM INFORMATION "SEARCH. EXE"
— BROADCASTING INFORMATION DATA BASE 1 "PROGRAM. 1 DB"
— BROADCASTING INFORMATION DATA BASE 2 "PROGRAM. 2 DB"
— RETRIEVAL INFORMATION DATA BASE "KEYWORD. DB"

FIG.19B

| FIELD / RECORD | BROADCASTING DAY | BROADCASTING TIME | PROGRAM NAME | BROADCASTING CHANNEL | RETRIEVAL INFORMATION |
|---|---|---|---|---|---|
| 0000 | 1995/11/30 (SAT) | 19:00~20:55 | PROFESSIONAL SOCCER AA VS. BB | 7 | 0200 |
| 0001 | 1995/12/1 (SUN) | 12:00~13:55 | SUNDAY MOVIE THEATER XXXX | 9 | 0300 |
| 0002 | 1995/12/1 (SUN) | 14:00~15:55 | OPQ FEMALE MARATHON | 7 | 0400 |
| ⋮ | | | | | |

FIG.19C

| FIELD / RECORD | BROADCASTING CHANNEL | BROADCASTING DAY | BROADCASTING TIME | PROGRAM NAME | RETRIEVAL INFORMATION |
|---|---|---|---|---|---|
| 0100 | 7 | 1995/11/30 (SAT) | 19:00~20:55 | PROFESSIONAL SOCCER AA VS. BB | 0200 |
| 0101 | 7 | 1995/12/1 (SUN) | 14:00~15:55 | OPQ FEMALE MARATHON | 0400 |
| 0102 | 9 | 1995/12/1 (SUN) | 12:00~13:55 | SUNDAY MOVIE THEATER XXXX | 0300 |
| ⋮ | | | | | |

FIG.20A

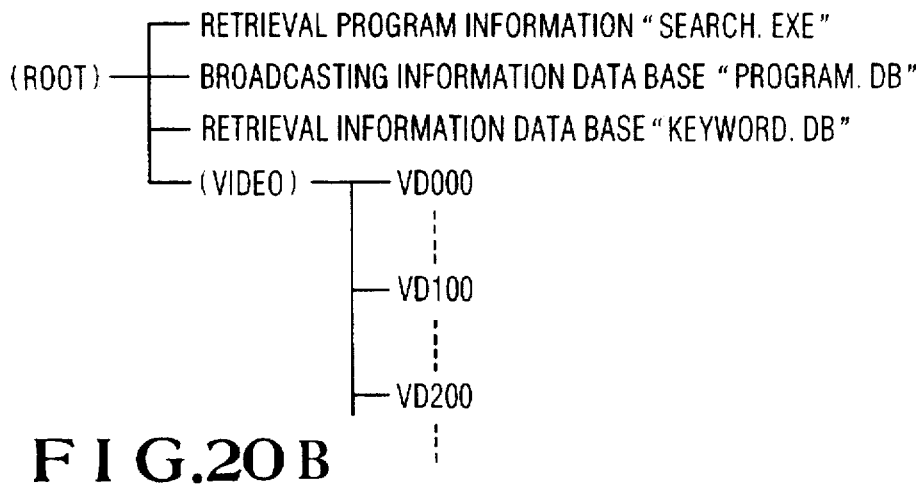

FIG.20B

| FIELD<br>RECORD | BROAD-CASTING DAY | BROAD-CASTING TIME | PROGRAM NAME | BROAD CASTING CHANNEL | RETRIEVAL INFORMATION |
|---|---|---|---|---|---|
| 0000 | 1995/11/30 (SAT) | 19:00~20:55 | PROFESSIONAL SOCCER AA VS.BB,1 | 7 | 0200 |
| 0001 | 1995/12/1 (SUN) | 21:00~22:55 | SUNDAY MOVIE THEATER XXXX | 9 | 0300 |
| ⋮ | | | | | |

FIG.20C

| FIELD<br>RECORD | KEY WORD | | GUIDANCE OF THE CONTENTS | RELEVANT VIDEO FILE NAME |
|---|---|---|---|---|
| | GENRE | OTHERS | | |
| 0200 | SPORTS | ABC PLAY GROUND | THE PLAY OF HIJ MOVED FROM THE EFG TEAM IS A HIGH-LIGHT IN THE THIRD GAME BETWEEN THE CHAMPION CANDIDATE TEAMS | VD100 |
| 0300 | MOVIE | RELEASED IN 1990 | THE SECOND PRODUCT OF THE DIRECTOR CDE WHO BECAME VERY FAMOUS BY HIS KLM. THE TOP BOX OFFICE MOVIE IN THE YEAR. RELEASED IN 1990 (USA) | VD200 |
| ⋮ | | | | |

FIG.21

○ PROGRAM INFORMATION ○

| YEAR / MONTH / DAY | TIME | CHANNEL |
|---|---|---|
| 95/12/1 | 12 : 00 – 13 : 55 | 9 |
| SUNDAY MOVIE THEATER XXXX | | |
| THE SECOND PRODUCT OF THE DIRECTOR CDE WHO BECAME VERY | | |
| FAMOUS BY HIS KLM. THE TOP BOX OFFICE MOVIE IN THE YEAR . | | |
| RELEASED IN 1990 (USA) | | |
| | | |

RETURN BY [CANCEL] KEY                VIDEO

TELEVISION SIGNAL RECEIVING APPARATUS INCORPORATING AN INFORMATION RETRIEVING AND REPRODUCING APPARATUS

BACKGROUND OF THE INVENTION

The present invention relates to a television signal receiving apparatus (television receiver) including an information reproducing apparatus (such as, for example, an optical disk reproducing unit) for reproducing pictures and sound by reading multi-media information from an information recording medium (such as, for example, an optical disk medium) in which multi-media information including characters, pictures (motion pictures and still pictures) and sound has been recorded, and relates more particularly to a television signal receiving apparatus for reading from a recording medium in which program information relating to television broadcasting programs (hereinafter referred to as television programs) has been recorded in advance as multimedia information, certain program information in such a manner that such reading is interlocked with a television program which is being received, based on user's instruction and reproducing and displaying the program information read.

At present, as a broadcasting source from which a television signal receiving apparatus can receive information, there are a ground broadcasting, a satellite broadcasting, a cable television (hereinafter referred to as CATV) broadcasting, etc. The number of channels of these broadcastings and the number of these television programs have been increasing rapidly in recent years and there has been a wide range of broadcasting programs which users can select out of their preference. The conventional television receiver can also display television pictures by receiving reproducing video signals from a video signal recording and/or reproducing apparatus such as a video cassette recorder (hereinafter referred to as a VCR) or a laser disc player (hereinafter referred to as an LD player).

Under the above-described circumstance, program information columns are available in the papers and television program information magazines (hereinafter referred to as program information magazines) such as television guide magazines are also being published from various publishers, as media for providing program information to users. Users can select channels of programs they want to watch from papers and program information magazines and can reserve recording of these programs in the video cassette recorder (hereinafter referred to as a VCR).

A compact disk (hereinafter referred to as a CD) which has been developed as a digital audio recording medium has a large memory capacity and, therefore, it has been utilized as an external memory medium for a personal computer (hereinafter referred to as a PC) or the like. A compact disk used for this purpose is called a CD-ROM. Because of a large capacity of the CD-ROM, in addition to the utilization of the CD-ROM for a conventional data base using characters, great attention has been paid to the utilization of the CD-ROM as a recording medium for a so-called multimedia software in recent years, which collectively records picture data such as a motion picture and a still picture, audio data such as a music and an effect sound and reproduction control data describing procedures for reproducing these picture data and audio data and which reproduces these picture data and audio data in accordance with this reproduction control data and user's instructions. Further, along with the progress of a data compression technology for motion pictures, attention has also come to be paid to a video CD which can make a maximum 74-minute recording of picture data such as a motion picture and a still picture, audio data and reproduction control data, as a recording medium for replacing a laser disk (hereinafter referred to as an LD) as one of media for a home AV apparatus.

Reproducing from an optical disk such as a CD-ROM and a video CD can be easily controlled by using a PC, and therefore, a user can instruct through the PC to reproduce data interactively and can also control such reproduction from an application program which is operated on the PC. This is a large difference from the conventional VCR and LD. Further, since pictures and sound are recorded as a digital signal, it is easy to write the digital signal into a PC and edit this signal, which is also a significant feature.

As a known example relating to the above-described system, JP-A-4-227381 describes a picture-in-picture system which connects a conventional television signal receiving apparatus with a computer having an external memory medium. This system transfers picture data stored in the video RAM within the television signal receiving apparatus to the computer having the external memory medium through a computer interface and enables a common utilization of the picture data by both the television signal receiving apparatus and the computer.

Recently, there is also an apparatus which can reproduce pictures and sound by simply connecting a reproducing apparatus of a CD-ROM to the conventional television signal receiving apparatus by an exclusive use of this reproducing apparatus in a simple form. For example, JP-A-3-53774 discloses a television receiver which reads television program data or the like from a CD-ROM in which this data has been recorded and displays the data in the television receiver.

SUMMARY OF THE INVENTION

An increase in the number of broadcasting channels increases a range of selection by users and, on the other hand, causes a problem of an excessive volume of information. When the number of broadcasting channels increases, the volume of articles of a program information magazine also becomes very large. Accordingly, it takes a longer time with more work than ever for a user to find out from this magazine information on when and in which channel a television program the user wants to watch is to be broadcasted. In some cases, the information which the user wanted can not be reached.

Further, papers and magazines have a limitation on the volume of information that can be transmitted on them and, therefore, these papers are disadvantageous in providing and retrieving information on television programs that are structured by pictures and sound.

On the other hand, JP-A-3-53774 which discloses the above-mentioned television signal receiving apparatus refers to a retrieval of information such as television program data but this disclosure does not show any detailed or systematic identification of the file structure and the retrieval method at all. Further, the disclosure gives no consideration to the function of promptly displaying the accessary information in an interlocked manner with the television program currently being broadcasted or currently being received. Accordingly, in the above disclosure, sufficient consideration has not been given to the method of promptly retrieving and displaying necessary information at a necessary time from a CD-ROM or the like in which program information has been stored.

Further, the conventional television signal receiving apparatus has only a limited passive application to a picture display based on video signals to be supplied, such as a receiving of a television program by a ground broadcasting, a satellite broadcasting or a CATV broadcasting and a display of a reproduction video signal from a video signal recording and/or reproducing apparatus such as a VCR or an LD player. The above-described picture-in-picture system enables only a transfer of picture data between the television signal receiving apparatus and the computer for common utilization of the picture data.

Thus, according to the conventional system, no consideration has been given to the method, for example, of using a television signal receiving apparatus as one of information terminals at home by utilizing the above-described optical disk and optical disk reproducer as a recording medium and a reproducing apparatus for the data base of the television signal receiving apparatus or for the multi-media software.

Accordingly, it is an object of the present invention to provide a television signal receiving apparatus which incorporates an information reproducing apparatus that can promptly read and display program information relating to a television program currently being received, by utilizing the information reproducing apparatus as a reproducing apparatus for a data base or for a multi-media software.

It is another object of the present invention to provide a television signal receiving apparatus which incorporates an information retrieving and reproducing apparatus that can read relevant program information from an information reproducing apparatus based on user's instruction and time information and reproducing and displaying this program information, by utilizing the information reproducing apparatus as a reproducing apparatus for a data base or for a multi-media software.

In order to achieve the above objects, the television signal receiving apparatus according to one aspect of the present invention is a television signal receiving apparatus including a television (TV) receiver/display with the same structure as that of the usual television receiver, and incorporates an information reproducing apparatus for reading desired information recorded in advance in an information recording medium, an interface unit for converting the desired information read from the information reproducing apparatus into an information signal that can be displayed on the TV receiver/display and supplying the converted information to the TV receiver/display, and a clock apparatus for outputting current time information that shows year, month, day of the month and time. The television signal receiving apparatus retrieves and reads the desired information from the program information recorded in the information recording medium based on a request for a reproduction and display of the signal and displays a picture on the TV receiver/display. This program information is the information relevant to each television program which is currently being received by the TV receiver/display and is made up of broadcasting information including a program name, a name or a number of the television channel, a date of the broadcasting, time of the broadcasting (a starting time of the broadcasting and a closing time of the broadcasting), and appendant information relating to the television program other than the broadcasting information.

The clock apparatus outputs time information for displaying the current year, month, day and time. When a request for reproducing and display and receiving information of a television program which is currently being received are sent to the information reproducing apparatus while the TV receiver/display is receiving this television program, the information reproducing apparatus reads from the information recording medium desired information relating to the television program currently being received, based on the received information. The desired information outputted from the information recording medium based on the received information is the above-described appendant information relating to the received television program or the broadcasting information.

The desired information read out from the information recording medium is converted to a video signal and/or an audio signal by the interface unit, supplied to the TV receiver/display and a picture/sound are displayed. In other words, when the desired information is appendant information, pictures for showing the information relating to the contents of the television program currently being received on the screen of the TV receiver/display are displayed, and when the desired information is broadcasting information, a list of programs having a format similar to those provided on the newspapers is displayed.

With the above-described arrangement, the present invention can utilize a television signal receiving apparatus as one the information terminals at home.

In order to achieve the above objects, the television signal receiving apparatus according to another aspect of the present invention further incorporates, in addition to the television (TV) receiver/display for receiving a television program and displaying a picture, a television apparatus control unit for controlling the operation of the TV receiver/display and outputting received information relating to the state of receiving a television program currently being received by the TV receiver/display, an information reproducing apparatus for reading program information relating to a desired television program recorded in advance in the information recording medium in the form of multi-media data and multi-media software, a television interface unit for converting the desired information read by the information reproducing apparatus from the information recording medium into an information signal that can be displayed by the TV receiver/display and supplying this information signal to the TV receiver/display, a clock apparatus for outputting the current time information for displaying the year, month, day of the month and time, an instruction/key word input apparatus for receiving an instruction and a key word from the user and outputting a control command, and an information retrieving unit for controlling the information reproducing apparatus by the control command from the instruction/key word input apparatus and retrieving the program information recorded in the information recording medium. The program information recorded in the information recording medium includes at least program names of television programs, channel numbers and dates and time of broadcasting, and at least one of said program information, sorted out based on information item such as broadcasting channel number or date of broadcasting, is recorded in the information recording medium. The instructions and key words inputted in the instruction/key word input apparatus, information received from the television apparatus control unit and time information from the clock apparatus are used as retrieval information, so that desired program information is read from the information recording medium and reproduced and displayed by the TV receiver/display.

Further, in the information recording medium broadcasting information including at least program names of television programs, channel numbers and date and time of broadcasting and video information (appendant information) including pictures of previews and high-light scenes of television programs and sound of a theme music are recorded, as program information relevant to the television programs, in the form of multi-media data and multi-media software.

The instruction/key word input unit receives key words (such as program names and channel numbers of television programs) relating to a television program desired by the user and supplies the key words to the information retrieving unit. The information retrieving unit retrieves from the information recording medium the corresponding program information of the television program based on the key words and time information from the clock apparatus. In the information recording medium, program information is recorded which includes broadcasting information having at least program names of television programs, channel numbers and date and time of broadcasting, and appendant information other than this broadcasting information. When a user has inputted only a channel as a key word, for example, the information retrieving unit retrieves program information based on the time when the retrieval instruction was issued, obtains recorded positions of program information of television programs that are being broadcasted at that time and recording positions of the program information relating to programs that are broadcast after that time and sends the recording position information to the information reproducing apparatus so as to read out these program information.

Based on these recording position information that has been sent from the information retrieving unit, the information reproducing apparatus operates to read out the desired program information from the information recording medium.

A microcomputer controls both the information retrieval processing and the reading of program information from the information recording medium.

The program information read from the information reproducing apparatus is multi-media data and multi-media software including picture data and audio data, and the program information is converted by the interface unit into video signals (such as, for example, video signals of the NTSC system) and audio signals (such as, for example, analog audio signals) that can be displayed by the receiver/display and are then displayed on the display screen of the TV receiver/display.

By the above-described operation, the information reproducing apparatus can be utilized as the reproducing apparatus for the data base or multi-media software of the television signal receiving apparatus. Thus, the information reproducing apparatus can be controlled based on the key word relating to a desired television program given by the user and the time information, and program information of the television program desired by the user can be easily read from the information recording medium and displayed, by utilizing the television signal receiving apparatus as an information terminal in a household.

BRIEF DESCRIPTION OF THE DRAWINGS

FIG. 2 is a diagram for showing one detailed example of program information which is recorded in the optical disk shown in FIG. 1.

FIGS. 5A to 5C are diagrams for showing the file structures of the optical disk shown in FIG. 1.

FIG. 6 is a flow chart for explaining the control procedure of reproducing and displaying the appendant information in the embodiment shown in FIG. 1.

FIGS. 7A and 7B are diagrams for showing another embodiment of the file structures of the optical disk shown in FIG. 1.

FIG. 8 is a diagram for showing one detailed example of the program list which is reproduced and displayed by being read either from the optical disk shown in FIG. 1 or from the optical disk shown in FIG. 10 in accordance with the retrieval control procedure shown in FIGS. 17 and 18.

FIG. 9 is a flow chart for explaining the procedure of reproducing and displaying the program list of the embodiment shown in FIG. 1.

FIG. 11 is a diagram for showing one detailed example of the program information recorded in the optical disk shown in FIG. 10.

FIGS. 12A to 12C are diagrams for showing one detailed example of the file structure of the program information shown in FIG. 11 in the optical disk shown in FIG. 10.

FIG. 13 is a diagram for showing one detailed example of the program information retrieval screen for retrieving the program information shown in FIG. 11 which is obtained in the embodiment shown in FIG. 10.

FIG. 14 is a diagram for showing one detailed example of the program genre selection screen when a genre has been assigned on the program information retrieval screen shown in FIG. 13.

FIG. 15 is a diagram for showing one detailed example of the retrieval result display screen for showing the result of retrieving program information when a genre has been assigned on the program information retrieval screen shown in FIG. 14.

FIG. 16 is a diagram for showing one detailed example of the program information display screen obtained by assigning desired program information on the retrieval result display screen shown in FIG. 15.

FIGS. 19A to 19C are diagrams for showing other detailed examples of the file structure of the program information shown in FIG. 11 in the optical disk shown in FIG. 10.

FIGS. 20A to 20C are diagrams for showing still other detailed examples of the file structure of the program information shown in FIG. 11 in the optical disk shown in FIG. 10

FIG. 21 is a diagram for showing one detailed example of the program information display screen for displaying the result of retrieving the program information for the detailed examples shown in FIGS. 20A to 20C.

DESCRIPTION OF THE PREFERRED EMBODIMENTS

Embodiments of the present invention will be explained below with reference to the drawings. The like reference numbers will be attached to the like portions in all the drawings.

Figure 1:
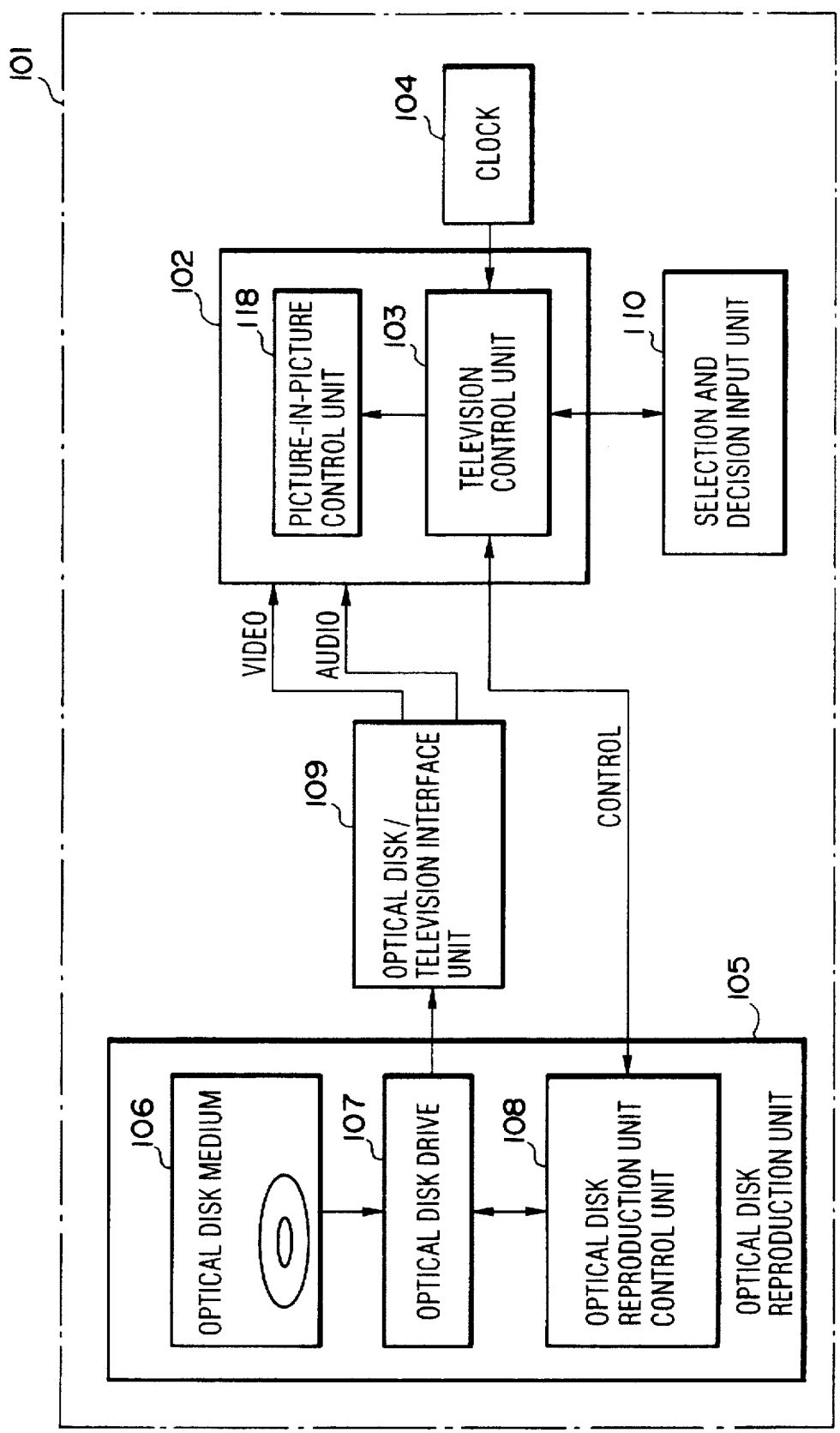
FIG. 1 is a block diagram for showing one embodiment of the television signal receiving apparatus incorporating the information reproducing apparatus, according to the present invention.

FIG. 1 is a block diagram for showing one embodiment of a television signal receiving apparatus which incorporates an information reproducing apparatus, according to the present invention. In FIG. 1, 101 designates a television signal receiving apparatus in the present embodiment, 102 a television (TV) receiver/display, 103 a television control unit, 104 a clock apparatus, 105 an optical disk reproduction unit as an information reproducing apparatus, 106 an optical disk medium, 107 an optical disk drive, 108 a control unit for the optical disk reproduction unit, 109 an optical disk/television interface unit, 110 a selection and decision input unit or a selection input unit, and 118 a picture-in-picture control unit.

Referring to FIG. 1, the television signal receiving apparatus 101 includes the TV receiver/display 102 having the same structure as that of conventional television signal receiving apparatuses, and displays a received video signal of a television broadcasting or a reproduced video signal supplied from a video signal recording and/or reproducing apparatus such as a VCR. The television signal receiving apparatus 101 further includes the clock apparatus for showing the year, month, day of the month and time and outputting this information as time information, and the optical disk reproduction unit 105. The optical disk reproduction unit 105 is connected to the TV receiver/display 102 through the optical disk/television interface unit 109. The TV receiver/display 102 is provided with the television control unit 103 which controls the whole of the television signal receiving apparatus 101 according to the control command sent from the selection and decision input unit 110 such as a remote controller which is operated by the user for a selective input operation. The television control unit 103 may be made up of CPU, ROM, RAM, etc., for example.

The optical disk reproduction unit 105 includes the optical disk reproduction unit control unit 108 and the optical disk drive 107, and the control unit 108 controls the optical disk drive 107 based on the control command from the television control unit 103 and makes the optical disk medium 106 carry out a reproducing operation. The optical disk medium 106 is recorded with program information or the like relating to the television program. The program information read from the optical disk medium 106 is converted by the optical disk/television interface unit 109 into a video signal and an audio signal that can be displayed and produced by the TV receiver/display 102 and these signals are supplied to the TV receiver/display 102.

FIG. 2 is a diagram for showing one example of the program information recorded in the optical disk medium 106.

Referring to FIG. 2, program information including at least names of television programs, channel names of these programs, dates of broadcasting and time of broadcasting (time of starting each broadcasting and time of closing each broadcasting) and appendant information other than these broadcasting information are recorded in the optical disk medium 106. The appendant information is the information relating to the contents of the television program and is the multi-media data covering picture data such as a motion picture and a still picture, audio data such as a music and an effect sound, text data, etc.

Figure 3:
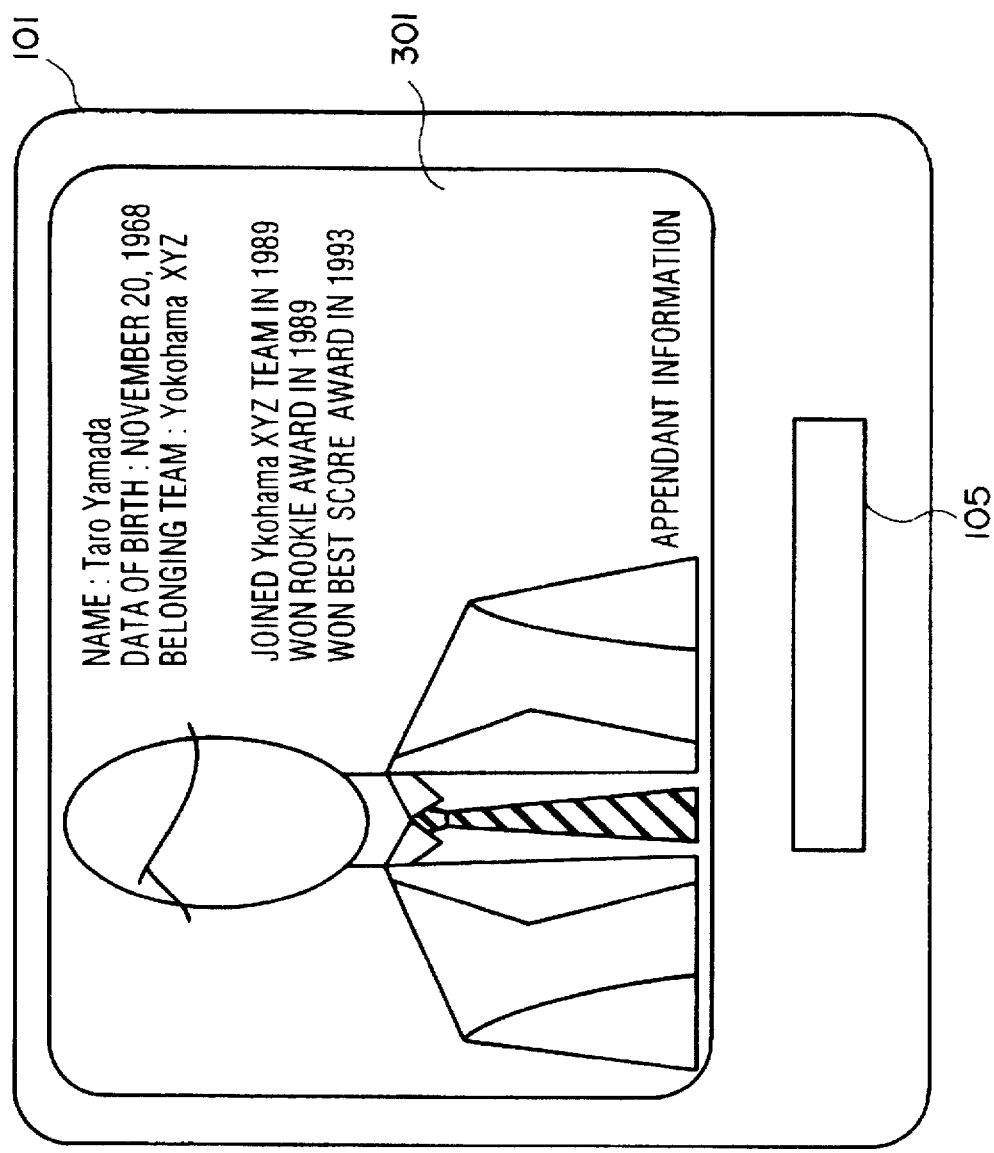
FIG. 3 is a diagram for showing one detailed example of the appendant information in the program information recorded in the optical disk shown in FIG. 1.

FIG. 3 shows and example of appendant information. As shown in FIG. 3, when the television program currently being received is a sports game, a profile 301 of teams and players in the game is shown, for example, and when the program currently being received is a movie or a drama, a profile of actors, actresses and a director is shown. The appendant information may also cover information for showing genre of television programs such as, for example, dramas, sports, news, movies, music, etc.

The operation of the present embodiment will be explained below. At first, explanation will be made of the case for controlling the optical disk unit 105 from the TV receiver/display 102 in a manner interlocked with a television program currently being received, reading appendant information of the television program from the optical disk 106 and reproducing displaying the information.

In FIG. 1, when the user has operated the selection and decision input unit 110, a predetermined control command is supplied to the television control unit 103 within the TV receiver/display 102. Based on this control command, the television control unit 103 controls the whole apparatus including channel selection and receiving of the television program, input change-over of pictures/sound, picture quality, sound control, etc. and, at the same time, manages the control status. Further, time information for showing the year, month, day of the month and time is always being inputted to the television control unit 103 from the clock apparatus 104, so that the television control unit 103 can recognize the current year, month, day of the month and time. Accordingly, when a desired television program is being received by the TV receiver/display 102 based on a user's instruction, the television control unit 103 always recognizes the channel name of the television program currently being received and the current year, month, day of the month and time, as received data which shows the status of reception.

In order to read from the optical disk medium 106 the appendant information relevant to a desired television program and to reproduce and display this information during the receiving of this program, a user operates the selection and decision input unit 110 to input a request for a reproduction and display and transfers this request to the television control unit 103. Upon receiving this reproduction and display request, the television control unit 103 recognizes the channel name of the television program currently being received and the current year, month, day of the month and time as the receiving data and transfers this reproduction and display request and this receiving data to the optical disk reproduction unit control unit 108 within the optical disk unit 105 as the control command.

Based on this control command, the optical disk reproduction unit control unit 108 recognizes the reproduction and display request of the appendant information and the channel name of the television program currently being received and the current year, month, day of the month and time and controls the optical disk drive 107 so that the predetermined appendant information relevant to the television program currently being received is read from the optical disk medium 106. More specifically, the broadcasting information including at least the television program name, channel name of this program, date of broadcasting, time of broadcasting (time of starting the broadcasting and time of closing the broadcasting) are recorded as the program information and the appendant information other than this broadcasting information are recorded respectively in the optical disk medium 106, as shown in FIG. 2 and, therefore, the optical disk reproduction unit control unit 108 controls the optical disk drive 107 so that the appendant information relevant to the television program currently being received is read from the optical disk medium 106 by using the channel name of the television program currently being received and the current year, month, day of the month and time, which are the receiving data of the control command, as the retrieval data and the above-described broadcasting data recorded in the optical disk 106 as the retrieval key.

The appendant information read from the optical disk medium 106 by the optical disk drive 107 is inputted to the optical disk/television interface unit 109. The appendant information is the multi-media data including picture data such as motion pictures and still pictures and music data such as a music and an effect sound, as described above. The appendant information is converted by the optical disk/television interface 109 into a video signal (such as, for example, a video signal of the NTSC system) and an audio signal (such as, for example, an analog audio signal) that can be displayed by the TV receiver/display 102 and the video signal and the audio signal are supplied to a video signal input terminal and an audio signal input terminal of the TV receiver/display 102 respectively. With above-described operation, the appendant information recorded in the optical disk medium 106 can be reproduced and displayed by the television signal receiving apparatus 101 in a manner interlocked with the television program currently being received.

Figure 4A:
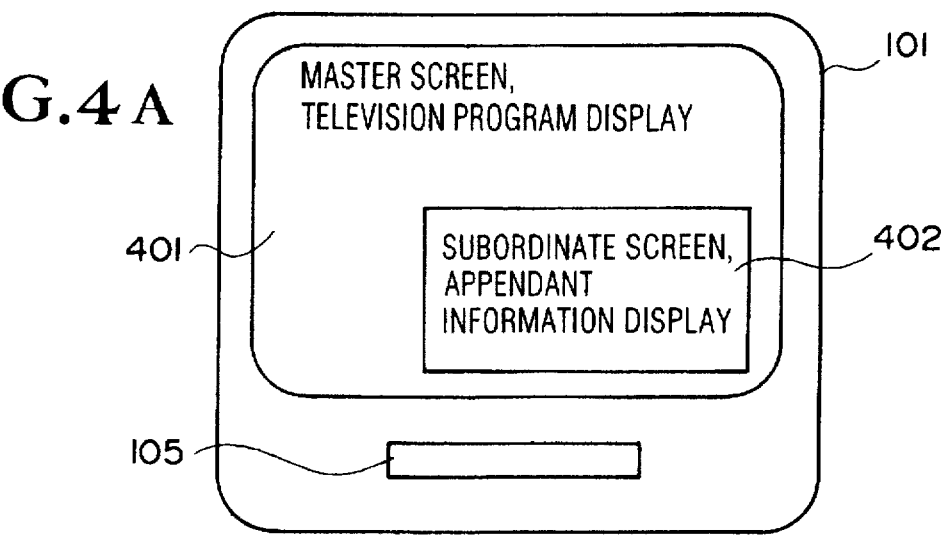
FIGS. 4A to 4C are explanatory diagrams for showing detailed examples of the display layout of the program information read out from the optical medium shown in FIG. 1.
Figure 4B:
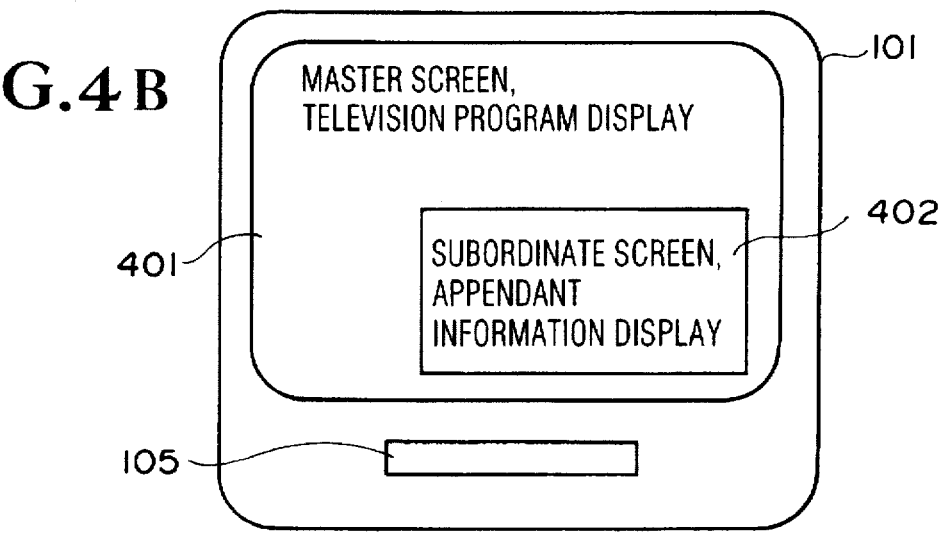
Figure 4C:
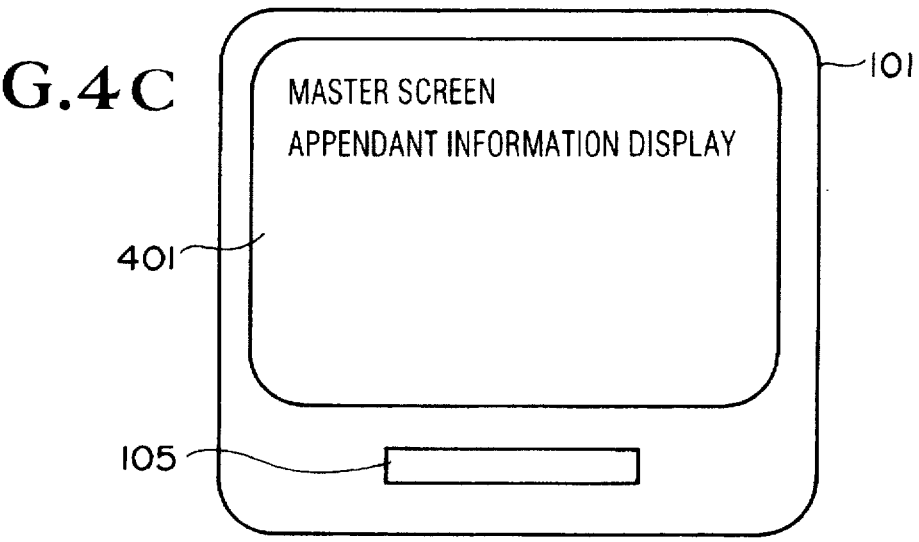

FIGS. 4A to 4C are diagrams for showing a method for displaying the appendant information on the screen of the television signal receiving apparatus 101. A television program currently being received may be displayed on a main screen 401 with the appendant information displayed simultaneously on a subsidiary screen 402, as shown in FIG. 4A. Alternatively, the appendix information may be displayed on the main screen 401 with the television program currently being received displayed simultaneously on the subsidiary screen 402, as shown in FIG. 4B. Alternatively, only the appendant information may be displayed, as shown in FIG. 4C. Such a display control and the selection of the display are carried out by the television control unit 103 according to the user's instruction operation of the selection and decision input unit 110. When the TV receiver/display 102 has the picture-in-picture control unit 118 like the embodiment as shown FIG. 1, any one of the display methods shown in FIGS. 4A, 4B and 4C can be selected freely. However, when the TV receiver/display 102 does not have the picture-in-picture function, the display method shown in FIG. 4C is employed.

FIGS. 5A to 5C show one detailed example of the file structure of the above-described program information (broadcasting information and appendant information) on the optical disk 106 according to the ISO9660 standard by using a CD-ROM as the optical disk medium 106.

The program information is hierarchically arranged in relevant video files in broadcasting information data base PROGRAM.DB, appendant information data base APPEND.DB and <VIDEO> directory, as shown in FIG. 5A.

The broadcasting data base PROGRAM.DB is structured by a record including four fields which are sorted in the sequence of days of broadcasting, broadcasting times, broadcasting channel names and program appendix information, as shown in FIG. 5B, and, among the respective broadcasting information, the day of broadcasting, broadcasting time and broadcasting channel name are recorded in each field. Record numbers of the appendant information data base APPEND.DB are recorded in the appendant information field.

The appendant information data base APPEND.DB is structured by a record including three fields of program names, program genre names and relevant video files corresponding to each record number recorded in the appendant information field shown in FIG. 5B, as shown in FIG. 5C. Of the broadcasting information, program names are recorded in the program name field; genre names such as, for example, sports, dramas, news, movies and music are recorded in the program genre name field, as described above; and file names of relevant video files in which the profile 301 of teams and players, the profile of actors, actresses and directors, for example, are recorded, as described above, are recorded in the relevant video file name field.

The relevant video file in the <VIDEO> directory in FIG. 5A is the file in which the profile 301 of teams and players and the profile of actors, actresses and directors, etc. are actually recorded in the forms of picture data such as motion pictures and still pictures, audio data and text data, as the appendant information of the television program, as shown in FIG. 3.

Referring to FIG. 1, description will be made of the detailed control procedures for controlling the optical disk unit 105 from the TV receiver/display 102 in an interlocked manner with the television program currently being received and reading the relevant appendant information from the CD-ROM having the above-described file structure.

When there is a request for reproducing and displaying appendant information from the selection and decision input unit 110 (step 601), the television control unit 103 recognizes the reproduction and display request of the appendant information, the channel name of the television program currently being received, current year, month, day of the month and time. The current year, month, day of the month and time can be recognized based on the time information from the clock apparatus 104. The television control unit 103 then transfers as a control command the reproduction and display request, the channel name of the television program currently being received and the current year, month, day of the month and time, to the optical disk reproduction unit control unit 108 of the optical disk unit 105 (step 602).

The optical disk reproduction unit control unit 108 recognizes the reproduction and display request, the channel name of the television program currently being received and the current year, month, day of the month and time that have been transferred to the control unit 108 (step 603), refers to each field of the broadcasting day, broadcasting time and broadcasting channel name in the broadcasting information data base PROGRAM.DB (FIG. 5B), by using the channel name of the television program, the current year, month, day of the month and time as the retrieval information, and retrieves the record (such as, for example, the record 0 in FIG. 5B) which corresponds to the television program currently being received (step 604). The control unit 108 then refers to the appendant information field (FIG. 5B) of the record that has been retrieved, obtains the record number (for example, the record number 200 in FIG. 5B) of the appendant information data base APPND.DB (step 605), and obtains the appendant information record (for example, the record 200 in FIG. 5C) corresponding to the record number of the appendant information data base APPND.DB from the appendant information data base APPEND.DB (FIG. 5C) (step 606).

The control unit 108 obtains the relevant video file name (for example, VD100) by referring to the field of the relevant video file name of the appendant information record (the record 200 in FIG. 5C) that has been obtained. With the above operation, it is possible to know the name of the file in which the profile 301 of teams and players and the profile of actors, actresses and directors, etc. are actually recorded in the forms of picture data such as motion pictures and still pictures, audio data and text data, as the appendant information of the television program (step 607).

The control unit 108 then reads the relevant video file corresponding to the relevant video file name (such as, for example, VD100) that has been obtained from the <VIDEO> directory, supplies the relevant video file to the television receiver/display 102 through the optical disk/ television interface unit 109, and makes the television receiver/display reproduce and display the contents of this file. With the above operation, the control unit 108 can provide the user with the appendant information relevant to the television program, such as the profile 301 of teams and players, the profile of actors, actresses, directors, etc. in a manner interlocked with the television program currently being received (step 608).

In order to reproduce and display the appendant information again, the operation returns to the step 607 and the processing is finished in all other cases (step 609).

One example of the file structure and control procedures of the optical disk medium 106 has been explained above. Although the data base has been divided into the broadcasting information data base PROGRAM.DB and the appendant information data base APPEND.DB as the file structure as shown in FIGS. 5A to 5C, it is not necessary to divide the data base into two. In other words, the data base may be only the broadcasting information data base PROGRAM.DB by recording the contents of each record of the appendant information data base APPEND.DB (FIG. 5C) in the appendant information field of the broadcasting information data base PROGRAM.DB (FIG. 5B). The file structure of the optical disk medium 106 in this case is shown in FIG. 7.

However, if the data base is divided into the broadcasting information data base PROGRAM.DB which is minimum necessary for retrieving the record corresponding to the television program currently being received and the appendant information data base APPEND.DB in the step 604 in FIG. 6, as described above, the following effects can be obtained. Namely, when the data base is divided into the two, all of the broadcasting information data base PROGRAM.DB necessary for retrieving in the step 604 in FIG. 6 can be made resident in the system memory within the optical disk reproduction unit control unit 108 by writing the contents of the broadcasting information data base in this system memory. With the above arrangement, the system can perform the above-described retrieval by only accessing this system memory and it is not necessary to access the optical disk medium 106 each time of the retrieval, which results in an improved retrieval speed.

As explained above, according to the present embodiment, it is possible to control the optical disk unit 105 from the TV receiver/display 102 in a manner interlocked with the television program currently being received, read the relevant appendant information from the optical disk medium 106 and reproduce and display the information. To be more specific, when the television signal receiver is currently receiving a sports game, for example, the system can provide the user with the profile 301 of teams and players and when the television signal receiver is receiving a movie or a drama the system can provide the user with the profile of actors, actresses and directors, as appendant information respectively.

Although the appendant information is reproduced and displayed by an input by the user of the reproduction and display request of the appendant information from the selection and decision input unit 110 according to the present embodiment, it may also be so arranged that the appendant information can be automatically reproduced and displayed each time the television program to be received changes. In this case, the following control operation is carried out.

When a desired television program is at first to be received or when a signal receiving channel name is to be changed over to another channel by the TV receiver/display 102, the channel name is designated by the user and the receiving of the desired television program is started, and at the same time, the receiving data including the channel name and the current year, month, day of the month and time and the reproduction and display request are being sent to the optical disk reproduction unit control unit 108 of the optical disk unit 105 from the television control unit 103. In this case, the channel name of the television program is being secured by the television control unit 103. The optical disk reproduction unit control unit 108 controls the optical disk drive 107 to make the appendant information of the television program currently being received be read from the optical disk medium 106 as described above and transmits the read appendant information to the TV receiver/display 102 through the optical disk/television interface unit 109. At the same time, the optical disk reproduction unit control unit 108 makes the broadcasting closing time be read out of the broadcasting time from the optical disk medium 106 and transmits the read closing time to the television control unit 103 of the TV receiver/display 102 through a means not shown.

The television control unit 103 compares the broadcasting closing time with the time information from the clock apparatus 104. When both information coincide, this means that the broadcasting of the television program currently being received ends. The television control unit 103 decides the end of the broadcasting and transmits reception data which has been secured including the channel name and the year, month, day of the month and time and the reproduction and display request, to the optical disk unit control unit 108 of the optical disk unit 105. A similar operation is repeated. Thus, the system can make a display of the appendant information each time the television program changes.

In the above explanation, the appendant information relevant to the television program currently being received is reproduced and displayed interlocked with the television program by using the channel number of the television program and the time information (current year, month, day of the month and time) from the clock apparatus 104 as the retrieval information. However, in the embodiment shown in FIG. 1, it is also possible to read the broadcasting information among the program information (FIG. 2) recorded in the optical disk medium 106, interlocked with the time information from the clock apparatus 104, and reproduce and display the broadcasting information as the program list of the day.

FIG. 8 shows one detailed example of the program list which is reproduced and displayed. The program list to be reproduced and displayed includes program names, channel names of the programs to be broadcasted, broadcasting time (broadcasting starting time and broadcasting closing time) in the same manner as those program lists that are provided on newspapers and program information magazines. The reproducing and displaying of this program list will be explained below.

Referring to FIG. 1, when the user wants a program list to be reproduced and displayed by reading the program list information from the optical disk medium 106 during the receiving of the television program, the user inputs a request for reproducing and displaying a program list by the selection and decision input unit 110 and transfers this request to the television control unit 103. The television control unit 103 receives this reproduction and display request and recognizes that there has been a request for reproducing and displaying the program list. At the same time, the television control unit 103 recognizes the date data based on the time information for showing year, month, day of the month and time, from the clock apparatus 104, and transfers this request for reproducing and displaying the program list and the date data as the control command, to the optical disk reproduction unit control unit 108 within the optical disk unit 105.

The optical disk reproduction unit control unit 108 recognizes the request for reproducing and displaying the program list and the current year, month, day of the month and time, from the control command and controls the optical disk drive 107 so as to read the corresponding predetermined program information from the optical disk medium 106. Since the broadcasting information including at least program names, channel names of the programs, dates of broadcasting and times of broadcasting (time of starting the broadcasting and time of closing the broadcasting) and the appendant information other than this broadcasting are recorded as the program information in the optical disk 106 as shown in FIG. 2, the optical disk reproduction unit control unit 108 controls the optical disk drive 107 so as to read the broadcasting information of the corresponding program information from the optical disk medium 106, by using the above-described control command (that is, the data of the current year, month, day of the month and time) as the retrieval information and further using the program information (the broadcasting information in this case), having the contents similar to those in the program list shown in the papers and program information magazines, as the retrieval key.

The broadcasting information read from the optical disk medium 106 by the optical disk drive 107 is converted, by the optical disk/television interface unit 109, into a video signal (such as, for example, a video signal of the NTSC system) and an audio signal (such as, for example, an analog audio signal) which can be displayed by the TV receiver/display 102, and are then supplied to the video signal input terminal and the audio signal input terminal respectively of the TV receiver/display 102.

Based on the above-described operation, of the program information recorded in the optical disk medium 106, the broadcasting information is reproduced and displayed by the television signal receiving apparatus 101 for the user as shown in FIG. 8. For example, when the time information from the clock apparatus 104 is "Nov. 30, 1993, Tuesday, 11:00 AM", the program list of Nov. 30, 1993 can be reproduced and displayed for the user.

The program list may also be displayed together with the television program currently being received as shown in FIGS. 4A and 4B, or only the program list may be displayed as shown in FIG. 4C. Such a display can be selected by the user's operation of the selection and decision input unit 110.

In the above explanation, the program list of the year, month and day of the month (that is, today) determined by the time information (the current year, month, day of the month and time) from the clock apparatus 104 is supplied to the user. However, it is also possible to reproduce and display a desired program list assigned by the user. This will be explained below.

Referring to FIG. 1, the user inputs a request for reproducing and displaying a program list and a date of the program which the user wants to refer to as the date data, by the selection and decision input unit 110. The request for reproducing and displaying the program list and the date data that have been inputted are transferred to the television control unit 103. The television control unit 103 recognizes the inputted request for reproducing and displaying the program list and date data, and transfers the request for reproducing and displaying the program list and the date data as the control command to the optical disk reproduction unit control unit 108 of the optical disk unit 105.

The optical disk reproduction unit control unit 108 controls the optical disk drive 107 so as to read the program information of the assigned date from the optical disk medium 106, by using the control command (particularly the date data) as the retrieval information and further using the broadcasting information (FIG. 2) recorded in the optical disk medium 106 as the retrieval key. The program information read from the optical disk medium 106 by the optical disk drive 107 is supplied to the video signal input terminal and the audio signal input terminal respectively of the TV receiver/display 102 through the optical disk/television interface unit 109.

By the above operation, of the program information recorded in the optical disk medium 106, the program information of the date assigned by the user can be reproduced and displayed by the television signal receiving apparatus 101, as the program list (FIG. 8) which is similar to those shown in the newspapers and program information magazines.

In the above-described case, the program list can also be displayed by any one of the methods shown in FIGS. 4A, 4B and 4C, according to the user's selection.

FIG. 9 is a flow chart which shows the control operation for displaying the program list in the method as explained above.

Referring to FIG. 9, when a request for reproducing and displaying a program list is inputted by the selection and decision input unit 110 (step 901), a decision is made whether a desired date of a program list has been assigned by the user or not (step 902). When a date has been assigned, the television control unit 103 recognizes the request for reproducing and displaying the program list and the date (date data) of the desired date of the program list and transfers the request for reproducing and displaying the program list and the desired date of the program list as the control command to the optical disk reproduction unit control unit 108 (step 903). When no desired date has been assigned, the television control unit 103 recognizes the request for reproducing and displaying the program list and the current year, month, day of the month and time (date data). The current year, month, day of the month and time can be recognized by the time information from the clock apparatus 104. The television control unit 103 then transfers the request for reproducing and displaying the program list and the current year, month, day of the month and time as the control command to the optical disk reproduction unit control unit 108 (step 904).

The optical disk reproduction unit control unit 108 recognizes the request for reproducing and displaying the program list and the date data (the desired date of the program or the current year, month, day of the month and time) that have been transferred (step 905), and retrieves a record (such as, for example, the record 0 in FIG. 5B) which corresponds to programs of the date of reproduction and display, by using the recognized date data as the retrieval information and by referring to the field of date of broadcasting, time of broadcasting and broadcasting channel in the broadcasting information data base PROGRAM.DB (FIG. 5B) (step 906). The optical disk reproduction unit control unit 108 refers to the appendix field (FIG. 5B) of the retrieved record, obtains the record number (such as, for example, the record number 200 in FIG. 5B) of the appendant information data base APPEND.DB (step 907), and obtains the appendant information record (such as, for example, the record 200 in FIG. 5C) corresponding to the obtained record number of the appendant information data base APPEND.DB (step 908). The optical disk reproduction unit control unit 108 then obtains a program name (such as, for example, the professional soccer AA vs. BB) by referring to the program name field of the obtained appendant information record (the record 200 in FIG. 5C) (step 909).

The obtained program name is supplied to the TV receiver/display 102 through the optical disk/television interface unit 109 and is displayed at a predetermined position on the display. When all the programs of the date of reproduction and display have been reproduced and displayed as the program list, the processing is finished (step 910), and the processing returns to the step 906 in all other cases.

The control procedures for reproducing and displaying a program list of the date desired by the user by controlling the optical disk unit 105 from the TV receiver/display 102 has been explained in detail above. As is clear from the above explanation, in the present embodiment, the date data and the request for reproducing and displaying a program list from the TV receiver/display 102 are transferred to the optical disk unit 105 as the control command, so that the broadcasting information of the user's desired date can be read from the optical disk medium 106 and reproduced and displayed as the program list of the desired year, month and day of the month.

In the above embodiment, the optical disk medium 106 and the optical disk unit 105 are used as an example of the information recording medium for recording program information and the information reproducing apparatus. However, the present invention is not limited to the above, and it is needless to mention that any other apparatuses can also be used as the information recording medium and the information reproducing apparatus if they can record and reproduce program information, such as a hard disk and a hard disk drive, or a floppy disk and a floppy disk drive, or a magnetic tape and a magnetic recording and reproducing apparatus, or others.

As explained above, according to the present embodiment, it is possible to utilize an information reproducing apparatus as a data base or a multi-media software which stores, as program information, both appendant information that supplements the contents of a television program and broadcasting information. Therefore, it is possible to promptly read such pogrom information when necessary and display pictures that supplement the contents of a television program currently being received and pictures of a program list. Thus, it becomes possible to utilize a television signal receiving apparatus as an information terminal at home.

Figure 10:
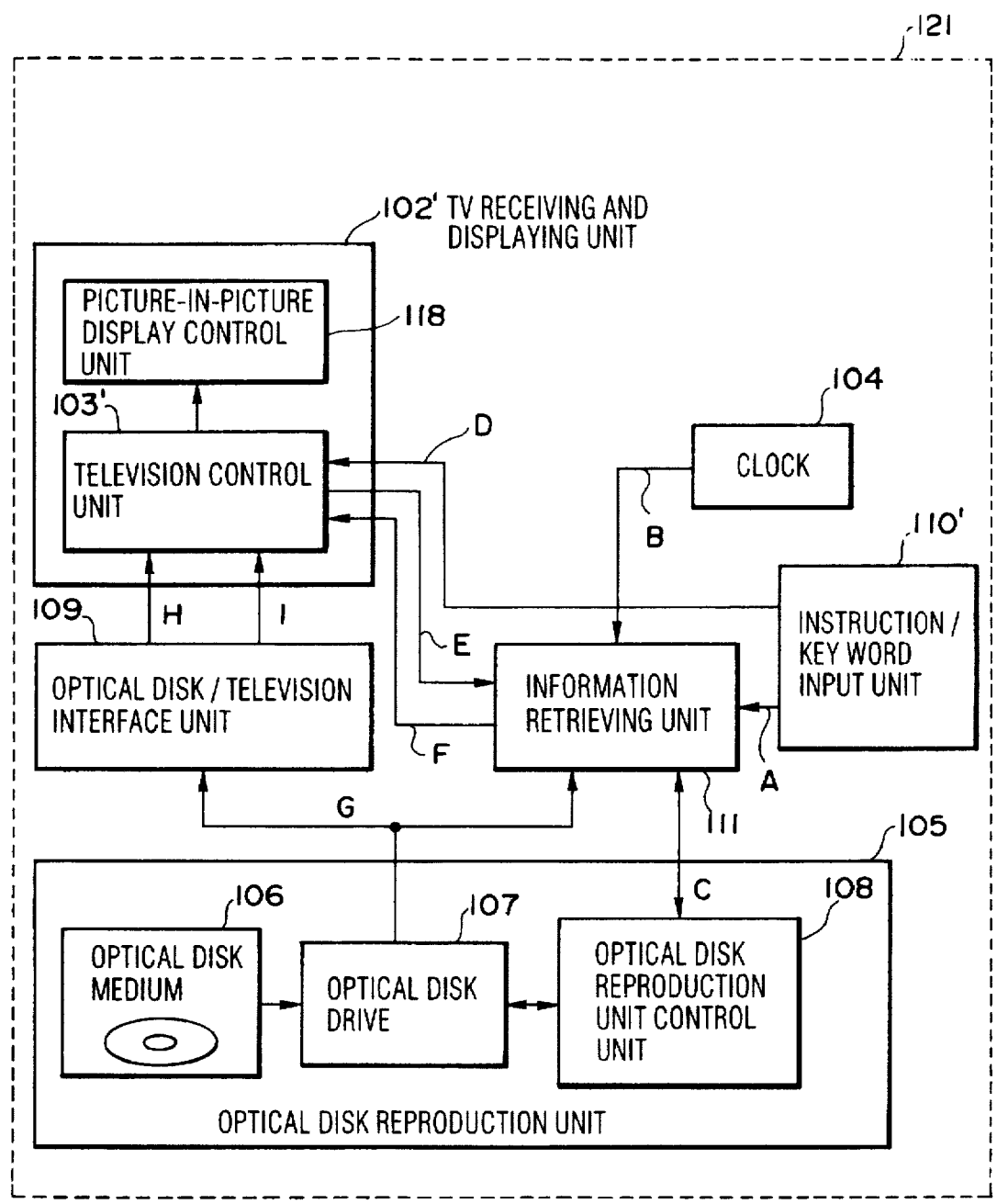
FIG. 10 is a block diagram for showing another embodiment of the television signal receiving apparatus incorporating the information retrieving and reproducing apparatus according to the present invention.

FIG. 10 is a block diagram for showing another embodiment of the television signal receiving apparatus that incorporates the information retrieving and reproducing apparatus, according to the present invention.

Referring to FIG. 10, 121 designates a television signal receiving apparatus of the present embodiment, 102' a television (TV) receiver/display, 103' a television control unit, 104 a clock apparatus, 105 an optical disk reproduction unit as an information reproducing unit, 106 an optical disk medium, 107 an optical disk drive, 108 an optical disk reproduction unit control unit, 109 an optical disk/television interface unit, 110' an instruction/key word input unit, 118 a picture-in-picture display control unit, and 111 an information retrieving unit. The television control unit 103' can be structured by a CPU, a ROM, a RAM, etc. and the information retrieving unit 111 may be structured by a CPU, a ROM and a RAM or may be included in the television control unit 103'.

In FIG. 10, the television signal receiving unit 121 includes the TV receiver/display 102', the optical disk unit 105, the clock apparatus 104, the information retrieving unit 111 and the optical disk/television interface unit 109. The TV receiver/display 102' displays received video signals of television programs and reproduced video signals supplied from a signal recording and/or reproducing apparatus such as a VCR. Further, the optical disk unit 105 is connected to the TV receiver/display 102' through the optical disk/television interface unit 109. Information G reproduced from the optical disk medium 106 by the optical disk unit 105 is supplied to the TV receiver/display 102' through the optical disk/television interface unit 109 and a picture of this information G can be displayed.

The television control unit 103' is provided in the TV signal receiver/display 102' and information for displaying a status of receiving a channel number of the program currently being received or the like is stored in the television control unit 103'. When necessary, this information can be supplied to the information retrieving unit 111 as receiving signal information E. The clock apparatus 104 generates current time information B for showing the year, month, day of the month and time at all times, and supplies this information to the information retrieving unit 111.

The instruction/key word input unit 110' is a control unit such as a remote control unit, and the instruction/key word input unit 110' selects and inputs a control command D and supplies the selected control command D to the TV receiver/display 102' according to user's instruction when the user wants to control the TV receiver/display 102', and selects and inputs a key word and supplies an instruction/key word A to the information retrieving unit 111 when the user wants to retrieve desired program information from the optical disk medium 106. For this purpose, the instruction/key word input unit 110' has a cursor key for instructing up and down and left and right for an easy move between selection items displayed on the screen of the TV receiver/display 102' and for an easy instruction of a selected item, and a cancellation and decision key for inputting an intention of the user, in addition to the normal operation key for selecting a channel and for adjusting sound volume.

The information retrieving unit 111 can recognize a channel number of a received television program by receiving the above receiving information E from the TV receiver/display 102' at the time of receiving the television program by the TV receiver/display 102', and can recognize the current year, month, day of the month and time from the time information B sent from the clock apparatus 104. The information retrieving unit 111 transmits to the optical disk unit 105 a retrieval control command C for retrieving from the optical disk 106 a position of information to be obtained by the user, based on the time information B from the clock apparatus 104 and the instruction/key word A from the instruction/key word input unit 110. The information retrieving unit 111 also supplies retrieval picture information F to the TV receiver/display 102' based on the information G supplied from the optical disk unit 105, in order to support the user interface.

In the optical disk unit 105, the optical disk reproduction unit control unit 108 controls the optical disk drive 107 according to the command C from the information retrieving unit 111 and makes information of a predetermined program be retrieved and reproduced from the optical disk medium 106. Program information relating to television programs is recorded in the optical disk 106. The program information G read from the optical disk 106 is converted into a video signal H and an audio signal I that can be displayed by the TV receiver/display 102' and is supplied to the TV receiver/display 102'.

FIG. 11 shows a detailed example of program information recorded in the optical disk medium 106.

Referring to FIG. 11, broadcasting information including at least names of broadcasting programs, channel numbers of these programs, days of broadcasting and broadcasting times (time for starting the broadcasting and time for closing the broadcasting), as program information, and key words relating to the television programs are recorded in the optical disk medium 106. In FIG. 11, two types of key words are shown as an example. One is a genre of television programs and the other is other items such as, for example, places of sporting events, years of release, etc. Other information such as names of attendants may also be included.

FIGS. 12A to 12C show one detailed example of the file structure of the program information shown in FIG. 11 recorded in the optical disk medium 106 based on the ISO 9660 standard, with the optical disk medium 106 used as the CD-ROM. This example will be explained below.

The above-described program information is recorded by being classified into a retrieval program SEARCH.EXE file, a broadcasting information data base PROGRAM.DB file and a retrieval information data base KEYWORD.DB file, as shown in FIG. 12A. The retrieval program SEARCH.EXE is an executive file for performing a retrieval processing by reading the contents of the file by accessing the data file to be explained below. If this file is recorded in the information retrieving unit 111 by using a ROM (read only memory) or the like, this file does not need to be recorded in the optical disk medium 106.

The file broadcasting information data base PROGRAM.DB is a data file structured by records of four fields sorted in the order of dates and times of broadcasting television programs, program names, channel numbers and retrieval information, as shown in FIG. 12B. Of the program information shown in FIG. 11, the days of broadcasting, broadcasting times, program names and channel numbers are recorded in the fields of the days of broadcasting television programs, broadcasting times, program names and channel numbers, respectively. Record numbers of the retrieval information data base KEYWORD.DB are recorded in the retrieval information field.

The retrieval information data base KEYWORD.DB is a data file structured by records of three fields covering genre names of television programs as key words, other key words and contents guidance, corresponding to each record recorded in the retrieval information field, as shown in FIG. 12C. In the field of the genre name of the television program, genre names such as, for example, sports, dramas, news, movies and music are recorded, as shown in FIG. 11. In the field of the "other key words", words to be used by the users as retrieval information are recorded as key words, such as, for example, places of the games when the genre of the television program is sports, and year of release when the genre is movies. Further, as shown in FIG. 12C, the field of guidance of the contents of television programs is provided and the guidance of the contents shown in FIG. 11 are recorded in this field.

Figure 17:
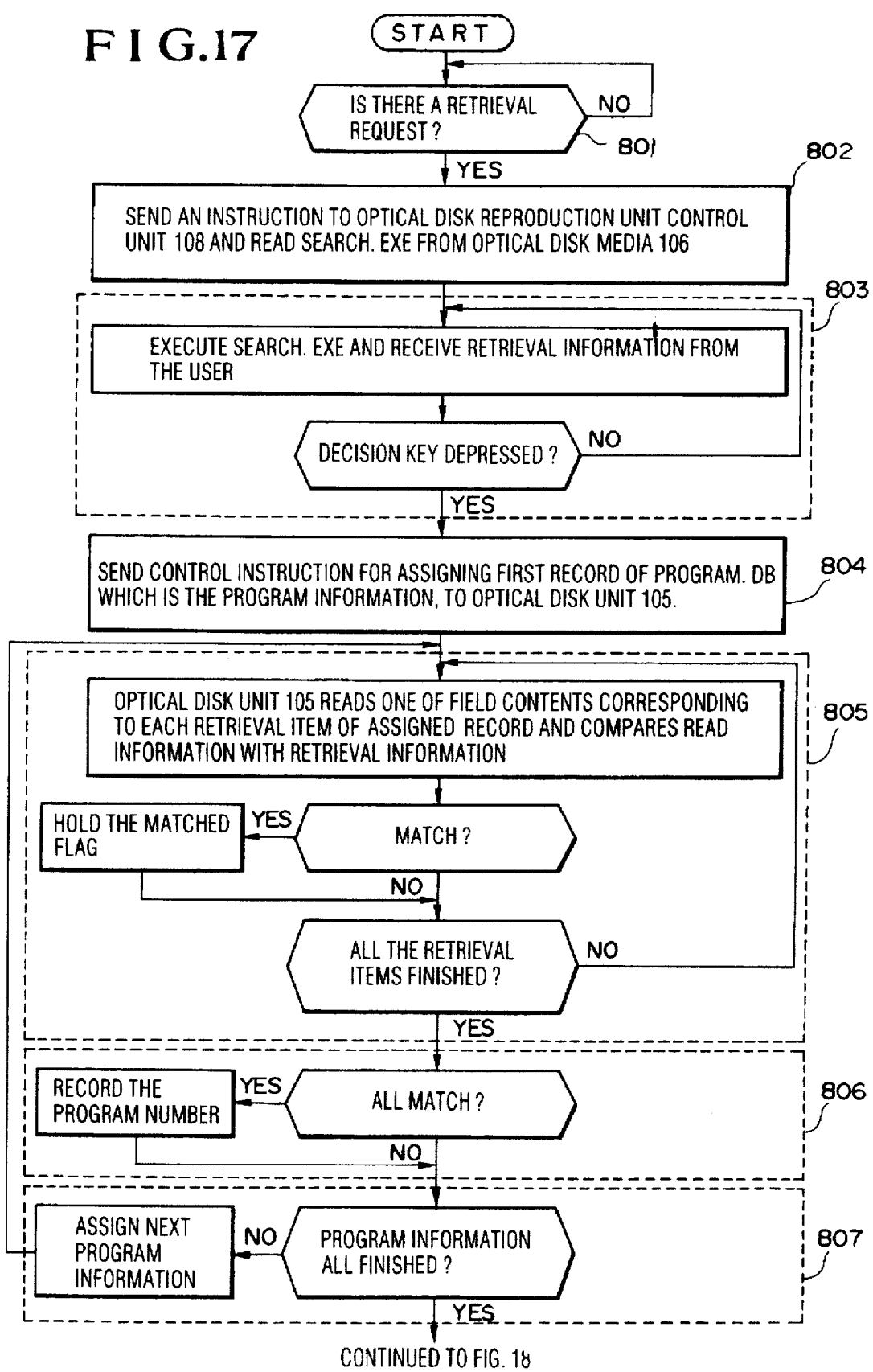
FIG. 17 is a flow chart for showing a part of one detailed example of the control procedure of retrieving the program information in the embodiment shown in FIG. 10.
Figure 18:
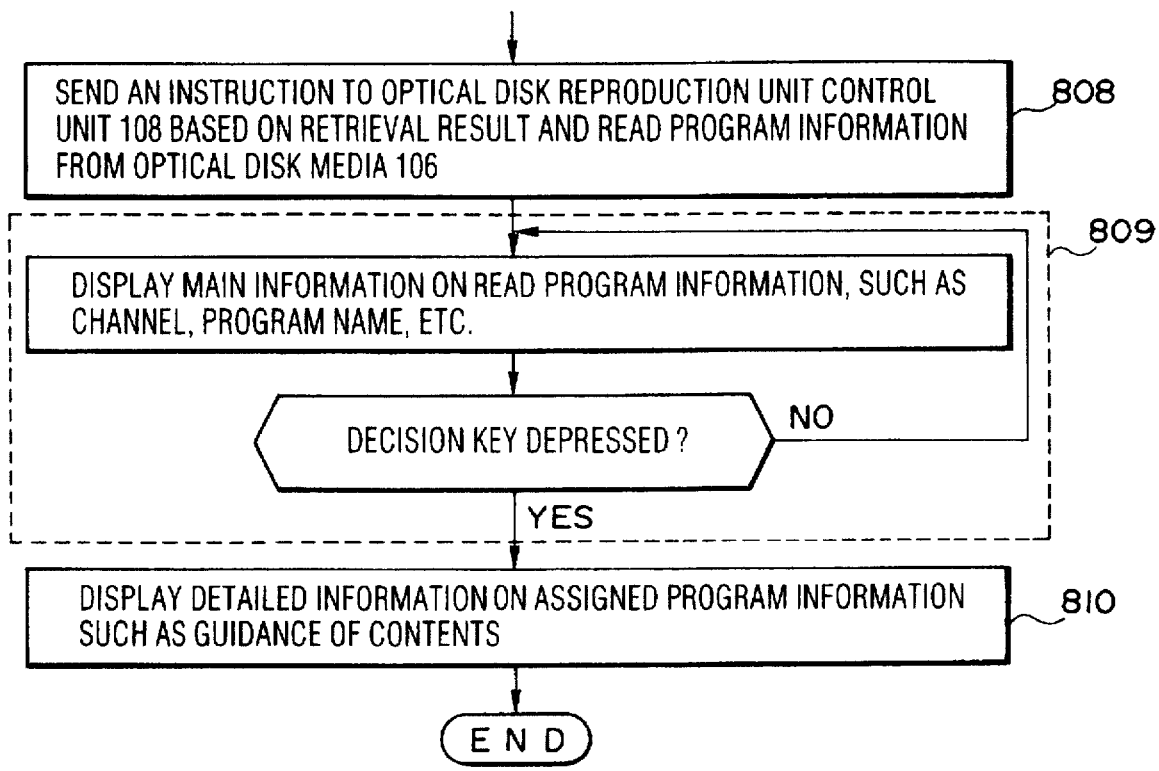
FIG. 18 is a flow chart for showing the remaining part of the retrieval control procedure after the procedure shown in FIG. 16.

FIGS. 17 and 18 are flow charts for showing a detailed example of the control procedures of the information retrieving unit 111 at the time of reading program information of a television program desired by the user from the CD-ROM having the file structures shown in FIGS. 12A to 12C by controlling the optical disk reproduction unit 105 according to the user's instruction. The operation of the present embodiment will be explained below, by referring to FIGS. 17 and 18, for the case where the user retrieves program information of a desired television program from the optical disk medium 106 by using a genre name, a channel name and a broadcasting day and time of the television program as the key words.

Description will be made below for the case of retrieving a channel number of a television program desired by the user and a day and time of the broadcasting.

The information retrieving unit 111 always monitors presence or absence of a request for retrieval (step 801), and when there is no request for retrieval, a television program is being received/displayed by the TV receiver/receiver 102'. When a request for retrieval has been inputted by the user's operation of the instruction/key word input unit 110', the information retrieving unit 111 receives this retrieval request and reads from the optical disk medium 106 a retrieval program which describes the contents of the retrieval processing, in order to shift to the mode of inputting conditions for the retrieval processing. For this purpose, the information retrieving unit 111 at first transmits to the optical disk reproduction unit control unit 108 the read control signal C including information which shows a position of the recording of the retrieval program SEARCH.EXE shown in FIGS. 12A to 12C. The optical disk reproduction unit control unit 108 which has received the read control signal C transmits the information showing the record position to the optical disk drive 107 and makes this optical disk drive read the retrieval program SEARCH.EXE from the optical disk medium 106. The retrieval program SEARCH.EXE that has been read is stored in the information retrieving unit 111 (step 802).

The processing then shifts to the step 803 and the information retrieving unit 111 executes the retrieval program SEARCH.EXE. At this time, the information retrieving unit 111 transmits the retrieval picture information F to the television control unit 103' and makes the TV receiver/display 102' display the retrieved picture on the screen.

FIG. 13 shows one detailed example of the retrieval screen and FIG. 14 shows a program genre selection screen for selecting a genre of a desired television program from this retrieval screen. These drawings will be explained below.

Referring to FIG. 13, items of "channel", "genre/ selection", --- laid out in the up and down direction on the left side are retrieval items. Among these retrieval items, retrieval items which are described like "---/selection" indicate that the user does not directly input values in these items but the user selectively determines items based on retrieval items displayed on the screen. Items laid out in the up and down direction on the right side are retrieval information input areas (hereinafter referred to as input areas) for the user to input retrieval information. In these areas, the frame of the current input area is displayed by a thick line (hereinafter referred to as a thick frame cursor) so as to facilitate the recognition of the current input position by the user, such as shown in the input area of the retrieval item "time", for example.

A cursor key in the instruction/key word input unit 110' (FIG. 10) is used for moving the thick frame cursor between a retrieval item and an input area. In other words, in order to move the thick frame cursor between the retrieval item and the input area, the left and right cursor key is used. Further, when the thick frame cursor is at the left side for showing a retrieval item, the up and down cursor key in the instruction/key word input unit 110' is used for a free selection of a retrieval item. When the thick frame cursor is at the right side for showing an input area, the left and right cursor can be used to select a desired input area, particularly at the portion where a plurality of input areas exist. For changing a numerical value within an input area, the up and down key can be used.

In the present embodiment, the user at first selects the "channel" as a retrieval item and then inputs a desired channel number in this input area. The channel selection key in the instruction/key word input unit 110' can also be used for this input. FIG. 13 shows the case of inputting the channel 9.

Next, the user moves the thick frame cursor to the retrieval item "genre". When the user has moved the thick frame cursor to an input area at the right side, the screen is automatically switched the genre selection screen shown in FIG. 14. The information retrieving unit 111 now transmits the control instruction C (FIG. 10) to the optical disk unit 105, reads key words for the genre from the program information recorded in the optical disk medium 106 and displays a list on the screen to avoid a duplication. A thick frame cursor is also displayed on this genre selection screen. The user selects a desired genre by using the cursor key in the instruction/key word input unit 110' and depresses the decision key in the instruction/key word input unit 110'. In this case, it is assumed that a movie is selected. When the user depresses the decision key, the screen returns to the retrieval screen as shown in FIG. 13 and the selected "movie" is displayed in the genre input area as shown in FIG. 13.

Next, in FIG. 13, the user skips the "program name" and selects the "date" and inputs a year, month and a day of the month in this input area. In this case, the information retrieving unit 111 calculates a day of the week based on the inputted year, month and day of the month, and automatically displays the day of the week of the year, month and day of the month in the input area of the retrieval item "day of the week". In this case, the screen shows an example that the user has inputted "Dec. 1. 1995", and as a result the day of the week is Sunday.

Next, the user moves to the retrieval item "time" and inputs "13:00". The channel key which is a numerical value key of the instruction/key word input unit 110' may be used for inputting the date and time.

The above is all the information the user is required to input, and by keeping the remaining retrieval items blank, the user depresses the decision key of the instruction/key word input unit 110' for executing the retrieval.

If the cancellation key of the instruction/key word input unit 110' is depressed when the retrieval screen is being displayed on the display screen of the TV receiver/display 102', the retrieval processing is stopped and the screen returns to a video display of the television program currently being received.

If the user has depressed the decision key of the instruction/key word input unit 110' without selecting/ inputting conditions on the retrieval screen, the information retrieving unit 111 decides that information on the current time has been requested by the current channel and performs a similar retrieval based on the current time information from the clock apparatus 104 and the current channel information E from the television control unit 103'.

The above describes the operation of the step 803 in FIG. 17.

Referring back to FIG. 17, the information retrieving unit 111 retrieves the relevant program information based on the retrieval information which has been set as described above. At first, the information retrieval unit 111 transmits to the optical disk unit 105 the control instruction C for reading the first program information (the program information of the record number 0000 in FIG. 12B) recorded in the optical disk 106 (step 804).

The optical disk reproduction unit control unit 108 which has received this control instruction transmits the information for showing the record position to the optical disk drive 107. In this case, when the inputted retrieval items are only the "channel", "genre", "date" and "time", the contents of the "channel" field are read from the record of the broadcasting information data base PROGRAM.DB recorded in the optical disk medium 106, as explained in FIGS. 13 and 14. The optical disk unit 105 compares the read information with the retrieval information (key word) which has been inputted by the user from the instruction/key word input unit 110', and holds the result of the comparison. The optical disk unit 105 reads the contents of the "genre" field from the above record and compares it with the retrieval information and holds the result of the comparison. The optical disk unit 105 repeats the similar operation for each of the "date" and "time" fields. On the other hand, if there is a key word inputted from the instruction/key word input unit 110' in the inputted retrieval items, the optical disk unit 105 further reads the retrieval information field information of the above record (0200 in FIG. 12C), transmits the record number shown by the contents to the optical disk reproduction unit control unit 108 and reads the contents of the first key word field of the corresponding record (the record 0200 in FIG. 12C) of the retrieval information data base KEYWORD.DB and compares the contents of the field with the retrieval information (step 805).

When all the contents compared coincide, the number of the program information is recorded temporarily. For this purpose, the number is stored in a RAM (random access memory) provided separately. Not only the number of the program information, but also all the program information may be read again and stored in the RAM (step 806).

After a retrieval processing for one program information has been finished, the optical disk unit 105 checks whether next program information exists or not. If there is next program information, the processing returns to the step 805 and the optical disk unit 105 repeats the above processing to read the next program information and compares the read information with the retrieval information in the manner similar to the above. The optical disk unit 105 repeats this processing until the last program information recorded has been retrieved (step 807).

After the retrieval processing for all the program information has been finished, in FIG. 18 the information retrieving unit 111 transmits to the optical disk unit control unit 108 the control instruction C for reading the program information corresponding to the number which is a retrieval result. If the above result is stored in the RAM, the information retrieval unit 111 reads the result from this RAM and then transmits the read result (step 808).

The read information G is supplied to the information retrieving unit 111 and the display contents are shaped and then converted into a video signal H and an audio signal I by the optical disk/television interface unit 109. These signals are supplied to the TV receiver/display 102' and displayed on the display screen. Depending on the recording status of the optical disk medium 106, the read program information may be directly supplied to the TV receiver/display 102' through the optical disk/television interface unit 109 and the television control unit 103', and displayed on the display screen of the TV receiver/display 102'. In the present embodiment, based on the assumption that a plurality of retrieval results exist, main program information such as channel numbers, dates and time of broadcasting and program names are displayed in a layout as shown in FIG. 15 as one example of the display screen of the retrieval result (step 809).

The thick frame cursor is shown in FIGS. 13 and 14 for facilitating the user to look at the guidance of the contents of each television program recorded in the optical disk medium 106 as shown in FIG. 11. Similarly, a thick frame cursor is also displayed on the display screen of the retrieval result as shown in FIG. 15. When the user moves the thick frame cursor to a desired television program on the display screen of the retrieval result and depresses the decision key of the instruction/key word input unit 110', a display screen of program information for showing all the information of the television program is obtained as shown in FIG. 16. When all the retrieval information can not be displayed in one screen on the display screen of the retrieval result shown in FIG. 15, other retrieval result can be displayed when the thick frame cursor is moved (step 810).

By carrying out the above-described control based on the file structures of the optical disk medium 106 as shown in FIGS. 12A to 12C, it is possible to quickly retrieve user's required program information from the optical disk medium 106 which records the program information, by operating the instruction/key word input unit 110'.

In the file structures shown in FIGS. 12A to 12C, the data base is divided into the broadcasting information data base PROGRAM.DB and the retrieval information data base KEYWORD.DB. However, the data base may not be divided this way. In other words, it may be arranged such that a retrieval information field is provided in the broadcasting information data base PROGRAM.DB (FIG. 12B) and the contents of each record of the retrieval information data base KEYWORD.DB (FIG. 12C) are recorded in this retrieval information field so that there is only one data base of the broadcasting data base PROGRAM.DB.

However, when the record corresponding to the retrieval information is divided into the broadcasting information data base PROGRAM.DB and the retrieval information data base KEYWORD.DB as described above, there is a following effect when the user has not inputted a key word as retrieval information.

When the data base is divided into the two, data volume of the broadcasting information data base PROGRAM.DB which is necessary for the retrieval at the step 806 in FIG. 17 can be decreased, so that the record of the broadcasting information data base PROGRAM.DB can be resident by being written in the system memory within the optical disk reproduction unit control unit 108. Therefore, it is possible to carry out the above retrieval by only accessing this system memory and it is not necessary to sequentially access the optical disk medium 106 at the time of retrieval, with a result of an improved retrieval speed.

Further, it is also possible that a list of television programs is displayed in the list format similar to those provided newspapers as shown in FIG. 8. In this case, a program list of television programs can be displayed when broadcasting times, channel numbers and program names are obtained. Accordingly, in this case, there is an advantage that a quick display can be made by only reading the broadcasting data base PROGRAM.DB at the step 805 in FIG. 17.

FIGS. 19A to 19C are diagrams for showing another detailed example of the file structure of the program information recorded in the optical disk medium 106.

This detailed example shows the case of recording a plurality of broadcasting information data bases PROGRAM.DB. In other words, the broadcasting data base PROGRAM.DB explained in FIGS. 12A to 12C is sorted by broadcasting information or by retrieval item and the result is recorded in the optical disk medium 106.

FIG. 19A shows a detailed example of the file structure for recording the program information shown in FIG. 11 by using the optical disk medium 106 as the CD-ROM, in the same manner as shown in FIGS. 12A to 12C. In this case, a broadcasting information data base 1, a PROGRAM1.DB file, which is the data sorted based on the broadcasting time and a broadcasting information data base 2, a PROGRAM2.DB file, which is the data sorted based on the broadcasting channel, are prepared for recording the broadcasting information.

FIG. 19B shows the contents of the broadcasting information data base 1 PROGRAM1.DB and FIG. 19C shows the contents of the broadcasting information data base 2 PROGRAM2.DB. The layout of the fields is different between these data bases just for the purpose of explanation, and the layout does not need to be different.

Although FIGS. 19A to 19C do not show the contents of the retrieval information data base KEYWORD.DB, it is assumed that the contents are the same as those in FIG. 12C. It is possible to correctly read the retrieval information data base KEYWORD.DB from both the broadcasting information data base 1 PROGRAM1.DB and the broadcasting information data base 2 PROGRAM2.DB, by following the contents of the retrieval information field. Therefore, it is not necessary to provide the retrieval information data base KEYWORD.DB for each of the broadcasting information data bases.

When there are data files of two different sorting results of the broadcasting information data base 1 PROGRAM1.DB and the broadcasting information data base 2 PROGRAM2.DB, the following effects are obtained.

When there has been a time designation within the retrieval information at a user's retrieval request, the retrieval processing is carried out by using the broadcasting information data base 1 PROGRAM1.DB. The broadcasting information data base 1 PROGRAM1.DB is arranged in temporal order. Accordingly, when program information which does not meet the retrieval condition is obtained after once program information which meets the retrieval condition has been obtained, none of the subsequent program information meet the retrieval condition. Therefore, it is no longer necessary to read the information from the optical disk medium 106, and thus the retrieval processing can be performed in a short time.

Further, when there has been a channel designation at a user's retrieval request, the retrieval processing is carried out by using the broadcasting information data base 2 PROGRAM2.DB. For the same reason as described above, the retrieval processing can be performed in a short time.

Further, the provision of the two broadcasting data bases is also effective for the case where, instead of inputting the retrieval information of the program information at one time, a user interface for retrieval is provided which involves a user input of conditions for each of the retrieval items such as, for example, the broadcasting time, genre, broadcasting channel, etc. and a sequential retrieval processing of these conditions. In other words, when the retrieval items to be processed sequentially start with the time, the processing is carried out by using the broadcasting information data base 1 PROGRAM1.DB. When the retrieval processing starts with the broadcasting channel, the processing is carried out by using the broadcasting information data base 2 PROGRAM2.DB. In these cases, the processing time can also be reduced in the same manner as described above.

Although the above explains the data files based on the sorting of the broadcasting time and the broadcasting channel, data bases sorted by other retrieval items can also be provided. Alternatively, data bases sorted by all the retrieval items may also be prepared by utilizing an advantage that the CD-ROM has a memory area of a large capacity.

As explained above, according to the present detailed example, it is possible to read the user's required program information from the optical disk medium 106 by controlling the optical disk unit 105 and reproduce and display the program information in the TV receiver/display 102'. Since the retrieval processing is carried out by the information retrieving unit 111, it is possible to display the result of the retrieval promptly and accurately.

FIGS. 20A to 20C are diagrams for showing further detailed examples of the file structure of the program information recorded in the optical disk 106.

Description will be made of an example of the case where broadcasting information such as a motion picture and sound are recorded in the optical disk 106.

FIG. 20A shows a hierarchical structure of files. In this example, video information is recorded in the <VIDEO> directory in addition to the retrieval program SEARCH.EXE file, the broadcasting information data base PROGRAM.DB file and the retrieval information data base KEYWORD.DB file, explained in FIGS. 12A to 12C. The video information is the information relevant to the contents of a television program, including picture data such as a motion picture and a still picture, audio data such as a music and an effect sound and multi-media data such as text data. For example, when the television broadcasting program is a sports game, a profile of teams and players is recorded and when the television program is a movie or a drama, a profile of actors, actresses and directors is recorded. Further, a motion picture of a preview and high-light scenes of a television program and sounds of a theme music of the television program are also recorded.

In the present detailed example, the contents of the broadcasting information data base PROGRAM.DB file shown in FIG. 20B are the same as those shown in FIG. 12B. However, a field for recording the relevant video file name is provided in the retrieval information data base KEYWORD.DB as shown in FIG. 20C. In this file, a file name of the video information (that is, <VIDEO> directory) relevant to the television program of the record is recorded.

Under the above structure, a case where the information of the record number 0001 (FIG. 20B) has been obtained as a result of a program retrieval made by the user, for example, will be explained below.

In this case, the information retrieving unit 111 (FIG. 10) recognizes the presence of a video information relevant to the television program, from the contents of the field of the record number 0001 of the relevant video file name, and displays a program information display screen as shown in FIG. 21. In this program information display screen, a selection area called "video" is newly displayed at the right bottom of the screen and a thick frame cursor is displayed in this selection area so that the user can select this area.

When this selection area has been selected by the instruction/key word input unit 110' (FIG. 10), the information retrieving unit 111 transmits the instruction C to the optical disk reproduction unit control unit 108 (FIG. 10), and reads, as the information G (FIG. 10), the record number 0300 of the retrieval information data base KEYWORD.DB in FIG. 20C from the retrieval information field of the record number 0001. Then, the information retrieving unit 111 transmits the instruction C to the optical disk reproduction unit control unit 108 by using the record number 0300, and obtains, as the information G, the relevant video file name VD200 recorded in the relevant video file name field of the record number 0300 of the retrieval information data base KEYWORD.DB.

Next, the information retrieving unit 111 outputs to the optical disk reproduction unit control unit 108 the instruction C for displaying the reproduction of the VD200 located in the <VIDEO> directory of the optical disk medium 106, based on the relevant video file name VD200.

Then, after receiving the instruction C, the optical disk reproduction unit control unit 108 controls the optical disk drive 107, and the optical disk drive 107 reads the video information from the optical disk medium 106 and transmits the video information to the optical disk/television interface unit 109. The optical disk/television interface unit 109 converts the received video information into a video signal (such as, for example, a video signal of the NTSC system) and an audio signal (such as, for example, an analog sound) that can be displayed by the TV receiver/display 102', and supplies the respective converted signals to the TV receiver/display 102'. The display screen of the TV receiver/display 102' is changed over from the program information display screen shown in FIG. 21 to a video screen relevant to the television program by the television control unit 103'. After the reproduction and display of the relevant video (such as a high-light scene, for example) has been finished, the screen is changed over again to the program information display screen shown in FIG. 21 and an instruction from the user is awaited.

As explained above, the user can easily retrieve a television program from a file in the file structures shown in FIGS. 20A to 20C as well. The user can also watch the video relevant to the television program, so that the user can obtain more information relevant to the desired television program. Further, a program producer can also provide program advertisement.

Figure 22:
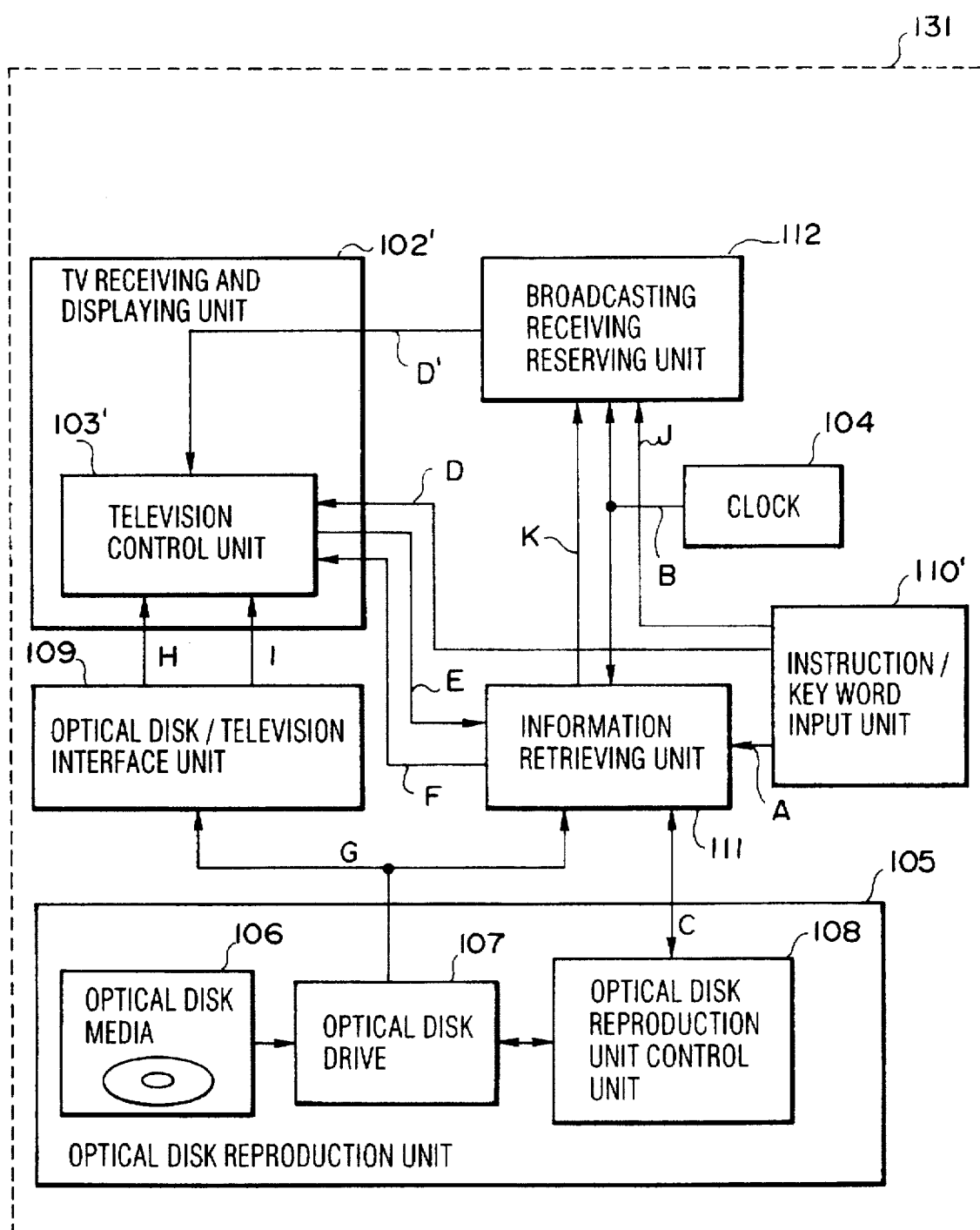
FIG. 22 is a block diagram for showing still other embodiment of the television signal receiving apparatus incorporating the information retrieving and receiving apparatus according to the present invention.

FIG. 22 is a block diagram for showing still another embodiment of the television signal receiving apparatus which incorporates the information retrieving and receiving apparatus, according to the present invention. 131 designates a television signal receiving apparatus of the present embodiment and 112 designates a broadcasting reception reserving (reservation) unit, and the parts corresponding to those in FIG. 10 are indicated by the same reference numbers.

In FIG. 22, the broadcasting receiving reserving unit 112 is structured by an independent block. However, the broadcasting reception reserving unit 112 may be included in the information retrieving unit 11. Alternatively, the units 103, 111 and 112 may be integrally structured by using the CPU, ROM and RAM.

The present embodiment enables a reservation of broadcasting programs by using the result of retrieving program information in addition to the function of the embodiment shown in FIG. 10.

Referring to FIG. 22, when the user has set in advance a broadcasting date and time and a channel number, the broadcasting reception reserving unit 112 has a function of automatically turning on/off the power source of the TV receiver/display 102' at the time on the date of the broadcasting and switching the signal receiving channel to the set channel number. The TV receiver/display 102' may incorporate this broadcasting reception reserving unit 112. However, in this case, the broadcasting reception reserving unit 112 is provided independently of the TV receiver/display 102'.

In conventional television receivers, users directly supplied reception reservation times and reception reservation channel numbers as control information to the broadcasting receiving reserving unit, by using an instruction/key word input unit such as a remote control unit. On the other hand, according to the present embodiment, a user supplies to the broadcasting reception reserving unit 112 a result of a program retrieval obtained from the optical disk medium 106 in which the program information has been recorded, by the control of the information retrieving unit 111 in the manner as described above, so that the desired television program can be reserved.

When the user wants to reserve a desired television program, the user instructs a reservation operation by using the instruction/key word input unit 110' such as a remote control unit. Then, the control information J is supplied to the broadcasting reception reserving unit 112 and the broadcasting reception reserving unit is set to an operating state, and the instruction/key word A is supplied to the information retrieving unit 111 so that the information retrieving unit 111 makes the optical disk reproduction unit 105 to carry out a retrieval operation for retrieving the program information as explained previously. For example, when the user selects a desired television program from the retrieval result obtained in the manner as described above and depresses a "program reservation" button which is provided in the instruction/key word input unit 110', the information retrieving unit 111 transfers the information on the broadcasting time and channel number, for example, of the television program, to the broadcasting receiving reserving unit 112 as program reservation information K, based on the instruction/key word A which has been supplied. In the case when the program information display screen as shown in FIG. 21 is displayed, a selection area may be provided which replaces the "program reservation" button in the display screen.

The program reservation information K is stored in the broadcasting receiving reserving unit 112 in the same manner as the conventional case where the user set this information by using a remote control unit or the like. Thereafter, the broadcasting receiving reserving unit 112 monitors time based on the time information from an built-in clock apparatus or the time information B from the clock apparatus 104. When the reserved time has come, the broadcasting reception reserving unit 112 controls the television control unit 103' and turns on the power source of the TV receiver/display 102' when this power source is off, and makes the TV receiver/display start receiving and displaying the reserved television program by switching the signal receiving channel to the set reservation channel.

The user can retrieve the desired television program by using the retrieval function of the TV receiver/display 102' and can directly use the retrieval result as the contents of the reservation of receiving the television program, in the manner as described above. Thus, it is possible to easily reserve the television program.

Figure 23:
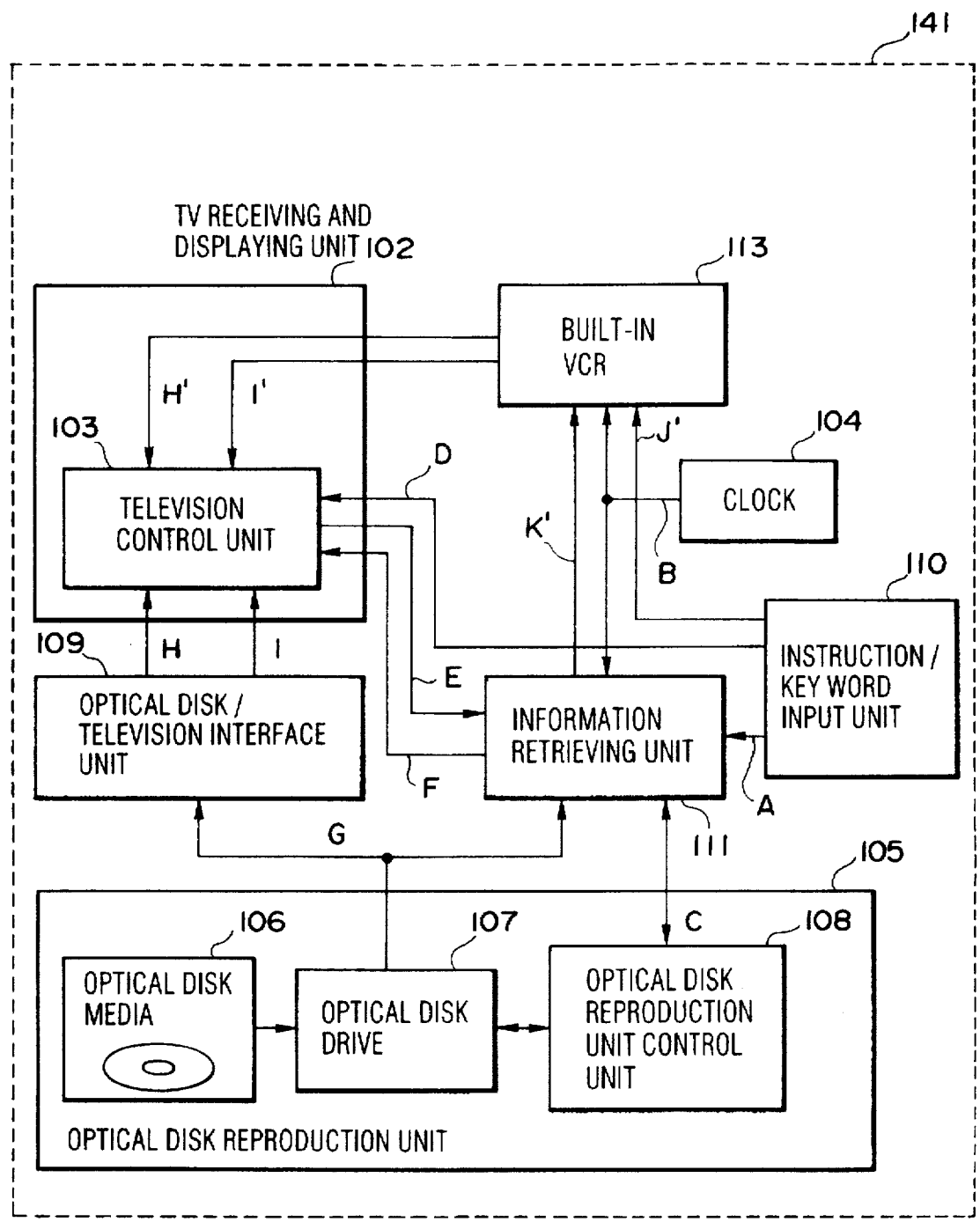
FIG. 23 is a block diagram for showing still other embodiment of the television signal receiving apparatus incorporating the information retrieving and receiving apparatus according to the present invention.

FIG. 23 is a block diagram for showing still another embodiment of the information retrieving and reproducing unit according to the present invention. 141 designates a television signal receiving apparatus of the present embodiment and 113 designates a built-in VCR, and the parts corresponding to FIG. 10 are indicated by the same reference numbers.

In FIG. 23, the television signal receiving apparatus 101 further includes the built-in VCR 113, so that the VCR 113 can record, reproduce and reserve a television program based on control information J' from the instruction/key word input unit 110' operated by the user. The VCR 113 incorporates a function similar to the function of the broadcasting reception reserving unit 112 shown in FIG. 22. Both a video signal H' and an audio signal I' reproduced by the VCR 113 are of course supplied to the TV receiver/display 102' and displayed on the display screen.

A "recording reservation" button is provided in the instruction/key word input unit 110' of the remote control unit or the like. When the user wants to reserve a television program, the user depresses the "recording reservation" button when a result of a program retrieval as shown in FIG. 15 or FIG. 16 or FIG. 8, for example, is being displayed. Then, a reservation operation similar to the operation in the embodiment shown in FIG. 22 is carried out and program reservation information K' such as the broadcasting date and time and the channel number, for example, obtained by the information retrieving unit 111 is supplied to the VCR 113 so that the recording reservation is set. The VCR 113 monitors time based on the time information from a built-in clock apparatus or the time information B from the clock apparatus 104. When the reserved time has come, the VCR 113 turns on the power source of itself and starts the recording of the reserved television program by switching the signal receiving channel to the set reservation channel.

The user can retrieve the desired television program by using the retrieval function of the television signal receiving apparatus 141 and can directly use the retrieval result for the setting of the recording reservation, as explained above. Thus, it is possible to easily reserve the recording of the incorporated VCR.

The VCR 113 may also be incorporated in the TV receiver/display 102' Which has the similar structure as that of the normal television signal receiver.

Figure 24:
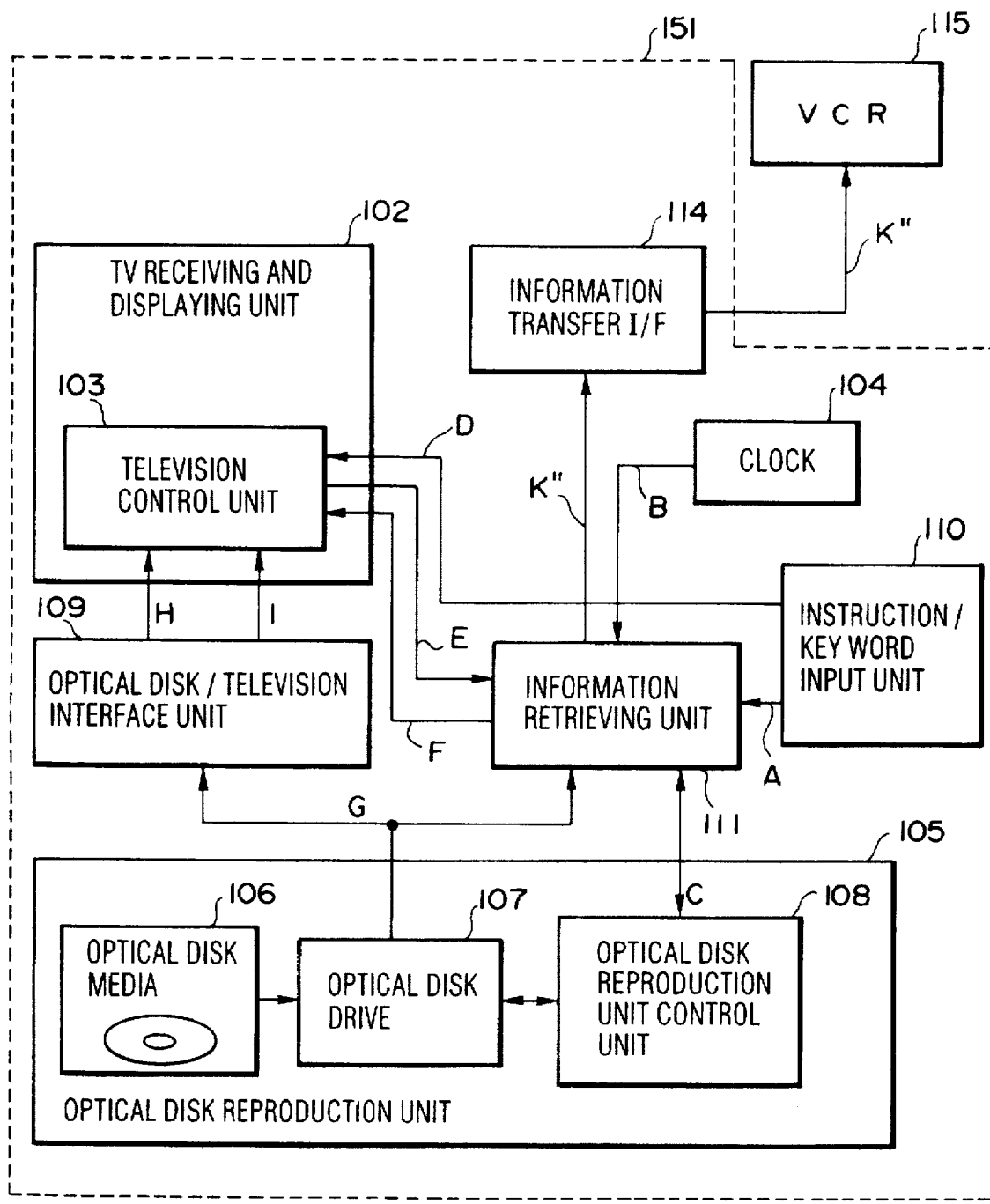
FIG. 24 is a block diagram for showing still other embodiment of the television signal receiving apparatus incorporating the information retrieving and receiving apparatus according to the present invention.

FIG. 24 is a block diagram for showing still another embodiment of the information retrieving and receiving apparatus according to the present invention. 114 designates an information transfer interface unit and 115 designates an external VCR, and the parts corresponding to those in FIG. 10 are indicated by the same reference numbers. The VCR 115 includes a function similar to the function of the broadcasting receiving reserving unit 112 shown in FIG. 22.

According to the present embodiment shown in FIG. 24, it is possible to reserve a program of the external VCR 115. For this purpose, the VCR 115 is connected to the information retrieving unit 111 through the information transfer interface unit 114, and program reservation information K" obtained in the manner similar to that in the embodiment shown in FIG. 22 or FIG. 23 is supplied to the VCR 115 through the information transfer interface unit 114 so that the program reservation can be carried out by the VCR 115.

The information transfer interface unit I/F 114 may be the one that has the communication standard of the RS232-C, for example.

It is possible to easily reserve the recording of the external VCR as described above.

The embodiments of the present invention have been explained above. However, the present invention is not limited to only the above-described embodiments. For example, although the information recording medium for recording program information is the optical disk medium 106 in each of the above-described embodiments, the recording medium may be a hard disk, or a floppy disk, or a magnetic tape, or an IC card.

Further, although the reservation of a receiving program, the reservation of the recording of the incorporated VCR and the reservation of the recording of the external VCR are carried out separately according to the embodiments shown in FIGS. 22 to 24, it is clear that it is also possible to have all these reservation functions.

As explained above, according to the present invention, the apparatus of the present invention includes the reproducing apparatus for an information recording medium, the clock apparatus and the information retrieving unit in addition to the television signal receiver/display having the same structure as that of the normal television signal receiver, records on the information recording medium both the broadcasting information which includes at least program names, channel names of the programs, dates of broadcasting and time of broadcasting (time of starting the broadcasting and time of closing the broadcasting), as the broadcasting information, and the retrieval information and video information as the accessary information other than the broadcasting information, and utilizes the reproducing apparatus as the reproducing apparatus for the data base or multi-media software of the program information that can be accessed by the operation unit such as a remote control unit, so that it is possible to retrieve easily and promptly the program information which matches the user's request.

To be more specific, the retrieval key word from the user, the channel number of the television program currently being received and the time information (current year, month, day of the month and time) are used as the retrieval information and the above-described broadcasting information recorded in the information recording medium is used as the retrieval key, so that it is possible to read the broadcasting information of the user's desired television program and relevant video information (such as, for example, the profile of teams and players based on video and sound when a sports game program has been retrieved) from the information recording medium and reproduce and display the read information. Therefore, it is possible to obtain more information relating to the desired television program by supplementing the contents of the program for satisfying the customer.

Further, when the time information (current year, month, day of the month and time) from the clock apparatus is used as the retrieval information and the broadcasting information recorded in the information recording medium is used as the retrieval key, it is possible to read the program information of the corresponding date and reproduce and display the program list which is similar to those shown in newspapers and program information magazines.

Further, when the broadcasting reception reserving unit is provided and the function of transferring the program information, which is a result of the retrieval by the user, to the broadcasting reception reserving unit or to the internal VCR or the external VCR is provided, the user's method of reserving a receiving program and setting a program recording can be simplified very much.

We claim:

1. A television signal receiving apparatus, comprising:
   a signal receiving and displaying unit for receiving a television program and making a picture display,
   a television unit control unit for controlling said signal receiving and displaying unit and outputting reception information relevant to a television program currently being received,
   an information reproducing apparatus for reading desired program information from an information recording medium in which television program information has been recorded in advance in the format of multi-media data and multi-media software,
   an interface apparatus for converting said read program information into an information signal that can be displayed on said signal receiving and displaying unit and supplying said information signal to said signal receiving and displaying unit,
   a clock apparatus for outputting current time information which shows the current year, month, day of the month and time,
   an input apparatus for receiving instructions and key words from a user and outputting a command, and
   information retrieving means, connected to receive said time information and reception information, for controlling said information reproducing apparatus in response to said command from said input apparatus and retrieving said program information recorded in said information recording medium,
   wherein said information retrieving means uses information including instructions and key words inputted to said input apparatus, reception information from said television control unit and time information from said clock apparatus, as information for retrieval, and controls said information reproducing apparatus to read desired program information from said information recording medium so that said signal receiving and displaying unit displays said desired program information that has been read.

2. A television signal receiving apparatus according to claim 1, wherein said television program information recorded in said information recording medium includes a program name, a channel number and a date and time of broadcasting for each program.

3. A television signal receiving apparatus according to claim 2, wherein said program information is laid out based on channel numbers.

4. A television signal receiving apparatus according to claim 2, wherein said program information is laid out based on dates of broadcasting.

5. A television signal receiving apparatus according to claim 1, wherein said television program information recorded in said information recording medium has broadcasting information including at least a program name, a channel number and a date and time of broadcasting for each broadcasting program, and video information including a motion picture and/or a still picture and sound relevant to each broadcasting program, and said information retrieving means retrieves broadcasting information of desired television program information from said information recording medium by using said retrieval information and displays the result of said retrieval in said signal receiving and displaying unit.

6. A television signal receiving apparatus according to claim 5, wherein said information retrieving means reproduces and displays video information of said desired program information, in addition to said broadcasting information, on said signal receiving and displaying unit.

7. A television signal receiving apparatus according to claim 1, further comprising reserving means for controlling said television control unit to receive a reserved program and display said reserved program based on a reservation of a desired television program from said input apparatus, wherein said information retrieving means retrieves said reserved program in response to an input of reservation information including a receiving time and a channel number of said reserved program to said input apparatus, and said reserving means controls said television control unit so as to receive said reserved program based on a result of said retrieval.

8. A television signal receiving apparatus according to claim 2, further comprising reserving means for controlling said television control unit to receive a reserved program and display said reserved program based on a reservation of a desired television program from said input apparatus, wherein said information retrieving means retrieves said reserved program in response to an input of reservation information including a receiving time and a channel number of said reserved program to said input apparatus, and said reserving means controls said television control unit so as to receive said reserved program based on a result of said retrieval.

9. A television signal receiving apparatus according to claim 5, further comprising reserving means for controlling said television control unit to receive a reserved program and display said reserved program based on a reservation of a desired television program from said input apparatus, wherein said information retrieving means retrieves said reserved program in response to an input of reservation information including a receiving time and a channel number of said reserved program to said input apparatus, and said reserving means controls said television control unit so as to receive said reserved program based on a result of said retrieval.

10. A television signal receiving apparatus according to claim 1, further comprising a video recording and reproducing apparatus including means for receiving and recording a reserved television program based on a reservation of a desired television program, wherein said information retrieving means retrieves said reserved television program in response to an input of reservation information of said reserved television program to said input apparatus, and said reserving means makes said video recording and reproducing apparatus record said reserved television program based on a result of said retrieval.

11. A television signal receiving apparatus according to claim 10, wherein said video recording and reproducing apparatus is a video recording and reproducing apparatus provided in said television signal receiving apparatus.

12. A television signal receiving apparatus according to claim 10, wherein said video recording and reproducing apparatus is an external video recording and reproducing apparatus, and said television signal receiving apparatus has an information transfer apparatus for transferring said result of retrieval to said external video recording and reproducing apparatus.

* * * * *